(12) United States Patent
Ki et al.

(10) Patent No.: US 11,321,244 B2
(45) Date of Patent: May 3, 2022

(54) BLOCK INTERFACE EMULATION FOR KEY VALUE DEVICE

(71) Applicant: Samsung Electronics Co., Ltd., Suwon-si (KR)

(72) Inventors: Yang Seok Ki, Palo Alto, CA (US); Ilgu Hong, Santa Clara, CA (US)

(73) Assignee: SAMSUNG ELECTRONICS CO., LTD.

(*) Notice: Subject to any disclaimer, the term of this patent is extended or adjusted under 35 U.S.C. 154(b) by 99 days.

(21) Appl. No.: 16/824,689

(22) Filed: Mar. 19, 2020

(65) Prior Publication Data
US 2021/0182211 A1    Jun. 17, 2021

Related U.S. Application Data

(60) Provisional application No. 62/948,797, filed on Dec. 16, 2019, provisional application No. 62/948,801, filed on Dec. 16, 2019.

(51) Int. Cl.
| | | |
|---|---|---|
| *G06F 12/02* | (2006.01) | |
| *G06F 3/06* | (2006.01) | |
| *G06F 12/1072* | (2016.01) | |
| *G06F 12/14* | (2006.01) | |
| *H04L 9/08* | (2006.01) | |
| *G06F 9/4401* | (2018.01) | |
| *G06F 21/57* | (2013.01) | |

(52) U.S. Cl.
CPC .......... *G06F 12/1072* (2013.01); *G06F 3/064* (2013.01); *G06F 3/0604* (2013.01); *G06F 3/0659* (2013.01); *G06F 3/0673* (2013.01); *G06F 3/0679* (2013.01); *G06F 9/4411* (2013.01); *G06F 12/0246* (2013.01); *G06F 12/1466* (2013.01); *G06F 21/575* (2013.01); *H04L 9/0861* (2013.01); *H04L 9/0894* (2013.01); *G06F 2212/7201* (2013.01); *G06F 2212/7207* (2013.01); *G06F 2221/034* (2013.01)

(58) Field of Classification Search
None
See application file for complete search history.

(56) References Cited

U.S. PATENT DOCUMENTS

| | | |
|---|---|---|
| 7,159,073 B2 | 1/2007 | Longo et al. |
| 7,779,273 B2 | 8/2010 | Dale et al. |
| 8,046,574 B2 | 10/2011 | Dale et al. |

(Continued)

OTHER PUBLICATIONS

Fred Knight. "SBC-3 Thin Provisioning Commands." Nov. 2008. T10. 08-149r4.*

(Continued)

*Primary Examiner* — Nathan Sadler
(74) *Attorney, Agent, or Firm* — Renaissance IP Law Group LLP

(57) ABSTRACT

A Key-Value (KV) storage device is disclosed. The KV storage device may include storage for a first object and a second object. Each object may include data associated with a key. A KV translation layer may translate a key to a physical address in the storage where the data is stored. A KV interface may receive a KV request involving an object, and a block interface may receive a block request involving an object. A block emulator may generate a KV request including a key generated from the block request.

19 Claims, 26 Drawing Sheets

(56) References Cited

U.S. PATENT DOCUMENTS

| | | | |
|---|---|---|---|
| 9,075,710 B2 | 7/2015 | Talagala et al. | |
| 9,270,445 B2 | 2/2016 | Lee et al. | |
| 9,361,408 B2 | 6/2016 | Marukame et al. | |
| 9,519,575 B2 | 12/2016 | Ramsundar et al. | |
| 9,531,541 B2 | 12/2016 | Beame | |
| 9,542,199 B2 | 1/2017 | Heo et al. | |
| 10,083,118 B2 | 9/2018 | Jeong et al. | |
| 10,289,421 B2 | 5/2019 | Jang et al. | |
| 10,620,866 B1* | 4/2020 | Kumar | G06F 16/288 |
| 10,956,346 B1* | 3/2021 | Ben-Yehuda | G06F 12/10 |
| 2013/0103729 A1 | 4/2013 | Cooney et al. | |
| 2013/0111187 A1* | 5/2013 | Liu | G06F 3/0673 |
| | | | 711/216 |
| 2013/0275656 A1* | 10/2013 | Talagala | G06F 12/0246 |
| | | | 711/103 |
| 2015/0160862 A1 | 6/2015 | Blott et al. | |
| 2015/0379009 A1* | 12/2015 | Reddy | G06F 16/2343 |
| | | | 707/747 |
| 2016/0246802 A1* | 8/2016 | Regni | G06F 16/20 |
| 2016/0366226 A1 | 12/2016 | Friedman et al. | |
| 2018/0157419 A1* | 6/2018 | Ki | G06F 3/0659 |
| 2019/0012085 A1* | 1/2019 | Schreter | G06F 16/176 |
| 2019/0384492 A1* | 12/2019 | Ki | G06F 3/0655 |
| 2021/0182400 A1* | 6/2021 | Ki | G06F 3/0604 |

OTHER PUBLICATIONS

Lee et al. "Howto Teach an Old File System Dog New Object Store Tricks." Jul. 2018. USENIX. HotStorage '18.*
Office Action for U.S. Appl. No. 16/846,261, dated Feb. 3, 2022.

\* cited by examiner

BLOCK INTERFACE EMULATION FOR KEY VALUE DEVICE

RELATED APPLICATION DATA

This application claims the benefit of U.S. Provisional Patent Application Serial No. 62/948,797, filed Dec. 16, 2019 and U.S. Provisional Patent Application Ser. No. 62/948,801, filed Dec. 16, 2019, both of which are incorporated by reference herein for all purposes.

This application is related to U.S. patent application Ser. No. 16/846,261, filed Apr. 10, 2020, which claims the benefit of U.S. Provisional Patent Application Ser. No. 62/948,797, filed Dec. 16, 2019 and U.S. Provisional Patent Application Ser. No. 62/948,801, filed Dec. 16, 2019, all of which are incorporated by reference herein for all purposes.

FIELD

The inventive concepts relate generally to storage devices, and more particularly to Key-Value (KV) storage devices that may process block requests.

BACKGROUND

Key-Value Solid State Drives (KV-SSDs) may provide an alternative way to store and access data. Non KV-based storage devices may provide a Logical Block Address (LBA) that a Solid State Drive (SSD) maps to a Physical Block Address (PBA) on the device. With KV-SSDs, a host may assign a key to the data. Provided the key is unique relative to other keys on the KV-SSD, data may be stored on the KV-SSD. This leads to a reduced set of instructions for the KV-SSD: typically, the instructions may include commands to store a value associated with a key (PUT), retrieve a value associated with a key (GET), and delete the value associated with a key (DELETE) (the specific commands names may vary).

But while KV-SSDs have advantages in terms of their operation, many applications still use block commands to read and write data to a storage device. KV-SSDs are not currently capable of processing such block commands.

A need remains for KV-SSDs (and other KV storage devices) to process block requests.

DETAILED DESCRIPTION

Figure 1:
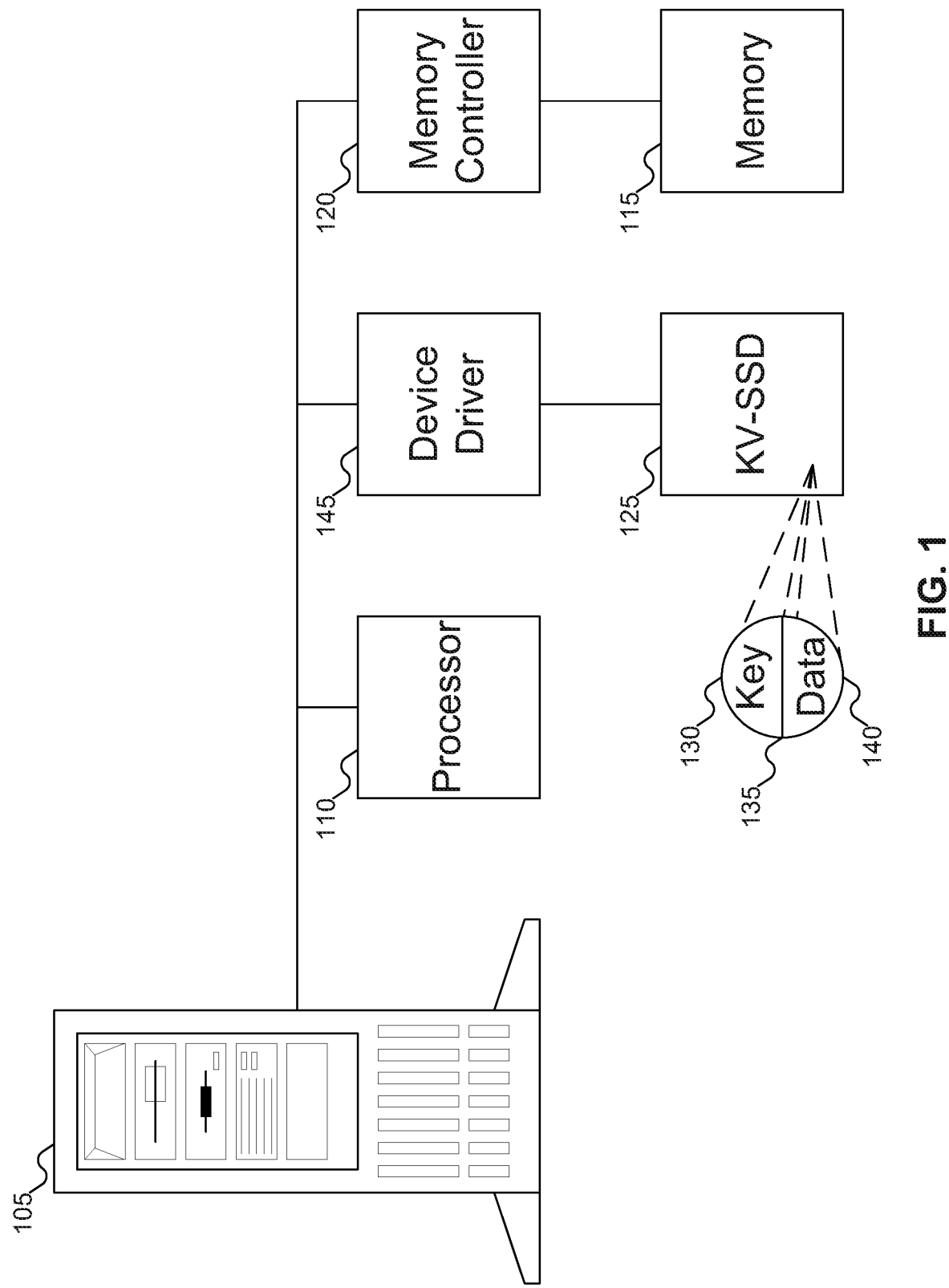
FIG. 1 shows a system including a Key-Value Solid State Drive (KV-SSD) capable of processing block requests, according to an embodiment of the inventive concept.

Reference will now be made in detail to embodiments of the invention, examples of which are illustrated in the accompanying drawings. In the following detailed description, numerous specific details are set forth to enable a thorough understanding of the invention. It should be understood, however, that persons having ordinary skill in the art may practice the invention without these specific details. In other instances, well-known methods, procedures, components, circuits, and networks have not been described in detail so as not to unnecessarily obscure aspects of the embodiments.

It will be understood that, although the terms first, second, etc. may be used herein to describe various elements, these elements should not be limited by these terms. These terms are only used to distinguish one element from another. For example, a first module could be termed a second module, and, similarly, a second module could be termed a first module, without departing from the scope of the invention.

The terminology used in the description of the invention herein is for the purpose of describing particular embodiments only and is not intended to be limiting of the invention. As used in the description of the invention and the appended claims, the singular forms "a", "an", and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. The components and features of the drawings are not necessarily drawn to scale.

By introducing the ability for a KV-SSD to receive block commands and translate those commands into key-value commands, a KV-SSD may be accessed by an existing application using block commands, without requiring the application to be reprogrammed or re-compiled, and without introducing a block interface storage device for use by the application.

There are at least two ways in which a KV-SSD may be augmented to offer block interface emulation. In one embodiment of the inventive concept, the SSD may include an external block interface as well as a KV interface, with a block emulator physically between the block interface and the KV Flash Translation Layer. In another embodiment of the inventive concept, a device driver running on the host may receive block requests from applications and translate those block requests into KV requests, which may then be provided to the KV interface on the KV-SSD.

One issue in attempting to emulate block commands with KV commands may be that a direct mapping of commands (write to PUT, read to GET, trim to DELETE) does not work. For example, a situation may occur wherein a write request to store data at a particular LBA, where the LBA provided is used as the key on the KV-SSD. If there is no object with that key, a simple translation of a write command to a PUT command may work. But if the KV-SSD already stores an object with that key, the PUT command may return an error.

This issue may be compounded by the fact that write commands may span multiple LBAs: even if the LBA that included the base address for the write command was not used as a key, the data may nevertheless overlap data stored in another object. For example, consider a situation where blocks are about 4 KB in size, and an application has previously written data to the LBA starting at address 0x2000. A write command to data starting at address 0x1000 may not appear as though the write command overwrites any data already on the KV-SSD. But if that write command includes more than about 4 KB worth of data, then at least part of the data previously written at address 0x2000 may be overwritten, although this fact may not be detected using a direct mapping of commands.

Similarly, a read request to a block interface storage device may work even if the data stored at that LBA had previously been invalidated. The block interface storage device may simply read whatever data is stored at the corresponding PBA: the data may or may not be appropriate for an application. But a GET command sent to a KV-SSD for a key that does not exist may return an error.

Trim commands may result in similar issues. If a trim command may be used to delete data that is only part of an LBA range written previously, the KV-SSD might attempt to delete an object that does not exist (since there may not be an object with that LBA as a key). This may also cause the KV-SSD to return an error.

Thus, the block interface emulator may need to do perform additional operations beyond mapping commands based on their names. In particular, the block interface emulator may serve to check whether LBA ranges overlap with existing objects storing data for other LBAs, and may determine how to handle such events. Further, if there are overlaps, existing objects may be partially or entirely modified by such write or trim commands.

Note that the expected behavior of the block interface emulation of the KV-SSD may be similar as for a block-based storage device. Given an initial arrangement of "blocks", the same or similar arrangement of "blocks" may exist after any operations, but with appropriate data modifications. Thus, for example, a situation may exist in which "Object 1" may include data written to LBAs 0-3, "Object 3" may include data written to LBAs 4-5, and "Object 2" may include data written to LBAs 7-14. If new data is received to be stored at LBAs 2-7, this partially overwrites the data in "Object 1" and "Object 2" (and completely overwrites the data in "Object 3"), producing an arrangement where "Object 1" includes data written to LBAs 0-1, "Object 4" includes the new data written to LBAs 2-7, and "Object 2" includes data written to LBAs 8-14. Then, if a read command is sent to read the data at LBAs 6-8, that data may be extracted from "Object 4" and "Object 2" and returned.

Some non-limiting advantages of the described embodiments of the inventive concept may include a single device supporting both KV and block interfaces, rather than using separate devices for each type of interface. Further, the block interface emulator may provide for added security. Since read commands for LBAs that do not store data (that is, for LBAs that have no corresponding object) may be detected by the KV-SSD returning an error, it is possible to enhance security by detecting unauthorized reads and block accesses: the KV-SSD may then lock down to prevent an intruder from accessing valid data from the KV-SSD.

There are various algorithms that may be used to implement embodiments of the inventive concept. One such algorithm may be termed the "split-merge" algorithm, and another such algorithm may be termed the "interval tree" algorithm.

Using the "split-merge" algorithm, each LBA may be stored as a separate object. The keys for each object may be related to the LBA. For example, the actual LBA may be used as the key, or the key may be generated from the LBA (for example, using a hash function that is likely to avoid hash collisions). Using the "interval tree" algorithm, metadata may be used to store which LBAs are associated with objects. In such an embodiment of the inventive concept, the keys may be generated in any suitable manner (since the key does not necessarily relate to the LBAs spanned by the data).

For example, a situation is described where a block write command, spanning LBAs 2-7, is received. Depending on the algorithm used, there are at least two variations in which embodiments of the inventive concept may operate.

In the "split-merge" algorithm, each LBA is associated with a separate block. Thus, when the block write command to write data to LBAs 2-7 is received, this block write command is split into six different PUT commands, each associated with different keys. Where data already exists— for example, in LBAs 2-5 and 7—those objects may be replaced with new objects storing the new data and the old data is lost.

In the "interval tree" algorithm, metadata may be used to store which LBAs are associated with different objects. Thus, the metadata may indicate that "Object 1" includes data spanning LBAs 0-3 "Object 2" includes data spanning LBAs 7-13, and "Object 3" includes data spanning LBAs 4-5. In this embodiment, "Object 4" may be added, with metadata indicating that the data spans LBAs 2-7. "Object 1" may be modified to delete the data that was previously associated LBAs 2-3, "Object 2" may be modified to delete the data that was previously associated with LBA 7. Such modification may be accomplished in any suitable manner. For example, if the KV-SSD supports a command that may trim data from one end or the other of the object, such a command may be used. Alternatively, the object may be read, modified internally to eliminate the unneeded data, and then written anew as an updated object with the same key. Further, in some examples, "Object 3" may be deleted.

A situation is described where a block read command, requesting the data in LBAs 6-8 is received. If the "split-merge" algorithm is used, each LBA is stored as a separate object, and those objects may be read and the data merged. If the "interval tree" algorithm is used, objects may store multiple LBAs, then the metadata may be used to determine which objects store the metadata. Continuing the example above, the metadata may indicate that "Object 4" includes LBAs 2-7 (and therefore two of the requested LBAs) and "Object 2" includes LBAs 8-13 (and therefore one of the requested LBAs). "Object 4" and "Object 2" may then be read, the data extracted from the values in those objects, and then that data merged to be returned to the application via the block interface emulator.

A situation may further be described where a block trim command is received, the block trim command requesting that the data in LBAs 2-7 be deleted. If the "split-merge" algorithm is sued, then the block trim command may be split into individual DELETE commands (one for each LBA). On the other hand, if the "interval tree" algorithm is used, then metadata may be used to determine which objects are affected by the block trim command. As noted, at the time the block trim command is received, "Object 1" includes data spanning LBAs 0-3, "Object 2" includes data spanning LBAs 7-13, and "Object 3" includes data spanning LBAs 4-5. Thus, the trim command involves deleting the tail end of the data in "Object 1", the head of the data in "Object 2", and the entirety of "Object 3". As with the block write command, "Object 1" may be modified to delete the data that was previously associated LBAs 2-3, "Object 2" may be modified to delete the data that was previously associated with LBA 7. Such modification may be accomplished in any suitable manner. For example, if the KV-SSD supports a command that may trim data from one end or the other of the object, such a command may be used. Alternatively, the object may be read, modified internally to eliminate the unneeded data, and then written anew as an updated object with the same key. In some examples, "Object 3" may be deleted.

While the above description is described in connection with the use of tables to identify which objects store data associated with which LBA ranges, the disclosed systems may use other implementations. For example, the disclosed systems may implement Interval Trees to manage the metadata information. Tree structures may be used for workloads having sequential writes, such as logs.

In some embodiments of the inventive concept, the disclosed systems may create a hybrid model, in which both Interval Trees and LBAs stored as individual blocks (or small block ranges) are used. For example, a default structure may be to use an Interval Tree. Then, if a node become sufficiently fragmented (that is, fragmentation exceeds a threshold, or the number of LBAs in the node drops below a particular threshold), the Split-Merge approach described above may be used for the data in the fragmented node. And, of course, if a node that was previously fragmented is overwritten with sequential data again that is large enough, then the node may return to the Interval Tree.

Some advantages of the embodiments of the inventive concept as described herein may include, but are not limited to, the disclosed systems being configured to support per-namespace configuration, user-defined key sizes (for example, about 4 byte), user-defined block sizes (for example, about 512 byte, about 4 K, about 8 K, about 16 K, about 32 K, etc.), and user-defined ordering or atomicity (which may follow the semantics of target device protocols, such as AT Attachment (ATA), Serial Attached Small Computer System Interface (SCSI) (SAS), and Non-Volatile Memory Express (NVMe), among others).

Components that support the operations described herein may include, but are not limited to, a splitter, a merger, and a batch command processor (to issue multiple KV commands as appropriate for the emulation), further described below. In some examples, the splitter may split a large data into a sequence of fixed-sized blocks, generate a sequence of keys to map for the blocks, create a batch operation for put with a sequence of (key, block) operations, issue a batch put, and when processing is complete return a completion to user with the first key. The merger may merge small blocks into a large data, generate a sequence of keys to retrieve blocks, create a batch operation for get with the appropriate keys, issue a batch get, and when processing is complete merge the retrieved blocks into one large block and return a completion with the first key to user.

Various trim semantics may be supported. These may include: Non-deterministic TRIM (each read command to the LBA after a TRIM may return different data), Deterministic TRIM (DRAT) (all read commands to the LBA after a TRIM shall return the same data, or become determinate), and Deterministic Read Zero after TRIM (RZAT) (all read commands to the LBA after a TRIM shall return zero).

FIG. 1 shows a machine including a Key-Value Solid State Drive (KV-SSD) configured to processing block requests, according to an embodiment of the inventive concept. In FIG. 1, machine 105 is shown. Machine 105 may include processor 110. Processor 110 may be any variety of processor. While FIG. 1 shows a single processor 110 in machine 105, machine 105 may include any number of processors, each of which may be single core or multi-core processors, and may be mixed in any suitable combination.

Machine 105 may also include memory 115. Memory 115 may be any variety of memory, such as flash memory, Dynamic Random Access Memory (DRAM), Static Random Access Memory (SRAM), Persistent Random Access Memory, Ferroelectric Random Access Memory (FRAM), or Non-Volatile Random Access Memory (NVRAM), such as Magnetoresistive Random Access Memory (MRAM) etc. Memory 115 may also be any suitable combination of different memory types. Machine 105 may also include memory controller 120, which may be used to manage access to memory 115.

Machine 105 may include Key-Value storage device 125, shown as a Key-Value Solid State Drive (KV-SSD). KV- SSD 125 may use a key-value interface to access data: an application or operating system may provide KV-SSD 125 with a key, such as key 130 of object 135, which KV-SSD 125 may then map to a location on KV-SSD 125. KV-SSD 125 may then access and return the value, shown as data 140 of object 135, stored at that location on KV-SSD 125. Unlike the relatively complex command set offered by some file systems on storage devices, KV-SSD 125 may offer a simplified set of commands, such as: GET (to retrieve the value associated with a provided key), PUT (to store the provided value on the KV-SSD, associated with either a provided key or with a KV-SSD generated key, which may be returned), and ERASE (to delete the value associated with the provided key from the KV-SSD, and remove the key-value association from the KV-SSD tables) KV-SSD 125 may support other commands as well and may use different command names than those shown, but the principles are generally as described. KV-SSD 125 may also be replaced with any other storage device that supports object storage as described in the embodiments of the inventive concept below.

Processor 110 may run device driver 145, which may support access to KV-SSD 125. While FIG. 1 shows KV storage device 125 specifically as a KV-SSD, embodiments of the inventive concept may extend to any type of KV storage device, regardless of its underlying hardware or storage mechanism.

Although FIG. 1 depicts machine 105 as a server (which could be either a standalone or a rack server), embodiments of the inventive concept may include machine 105 of any type without limitation. For example, machine 105 could be replaced with a desktop or a laptop computer or any other machine that may benefit from embodiments of the inventive concept. Machine 105 may also include specialized portable computing machines, tablet computers, smartphones, and other computing machines. In addition, the application that may be accessing data from KV-SSD 125 may located in another machine, separate from machine 105 and accessing machine 105 via a network connection traversing one or more networks of any types (wired, wireless, global, etc.).

Figure 2:
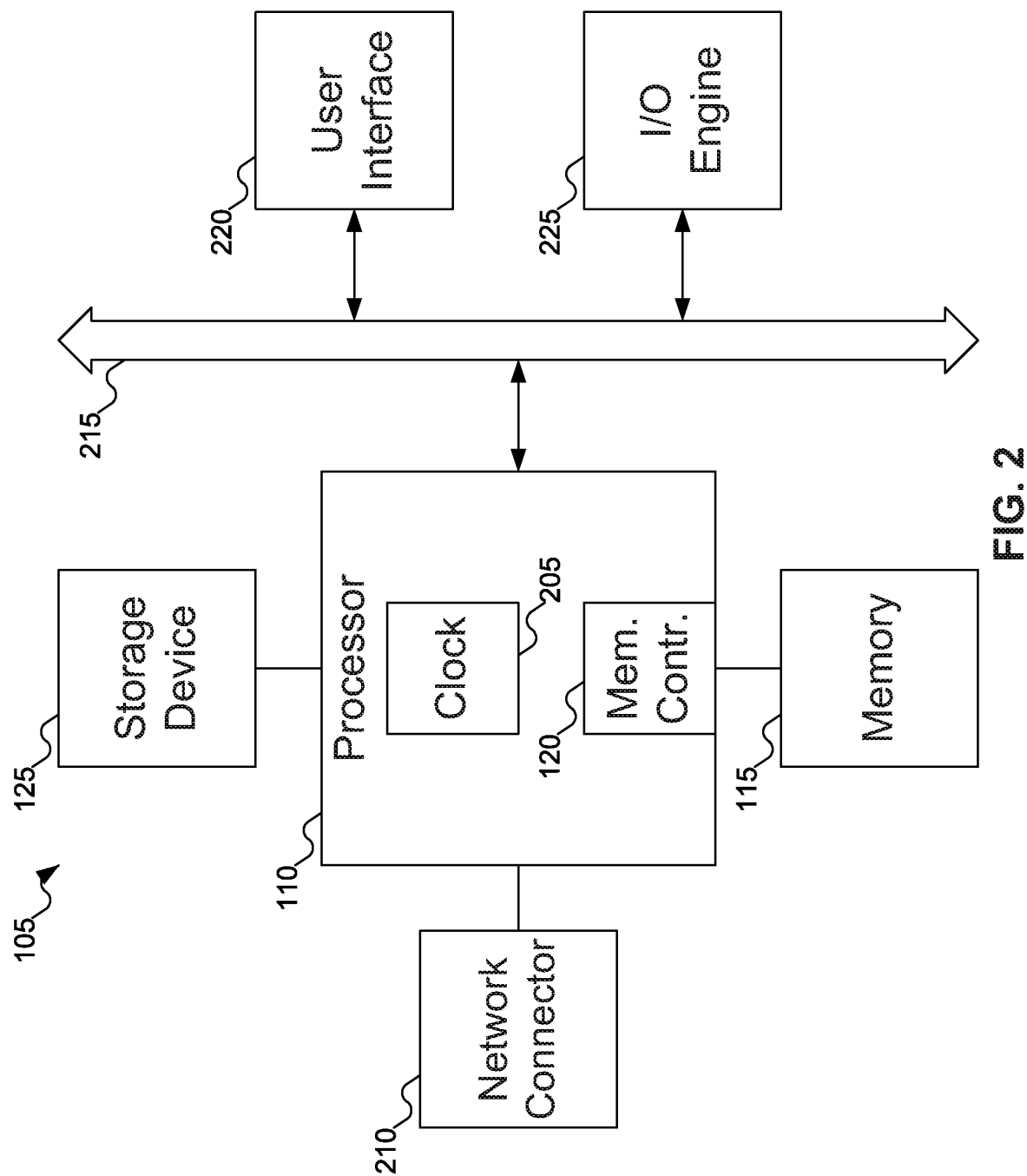
FIG. 2 shows additional details of the system of FIG. 1.

FIG. 2 shows additional details of machine 105 of FIG. 1. In FIG. 2, typically, machine 105 includes one or more processors 110, which may include memory controllers 120 and clocks 205, which may be used to coordinate the operations of the components of device 105. Processors 110 may also be coupled to memories 115, which may include random access memory (RAM), read-only memory (ROM), or other state preserving media, as examples. Processors 110 may also be coupled to storage devices 125, and to network connector 210, which may be, for example, an Ethernet connector or a wireless connector. Processors 110 may also be connected to buses 215, to which may be attached user interfaces 220 and Input/Output interface ports that may be managed using Input/Output engines 225, among other components.

Figure 3:
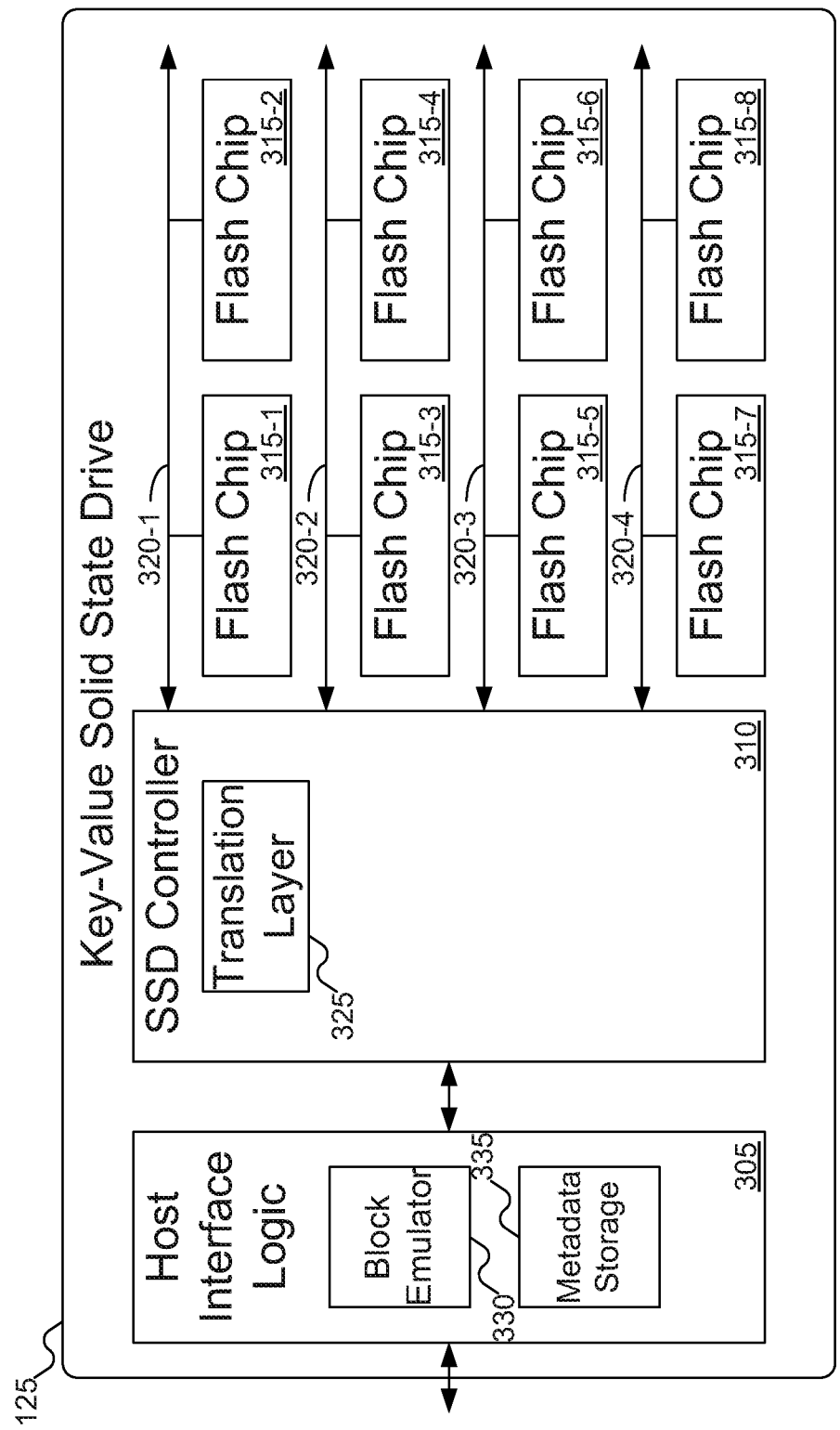
FIG. 3 shows details of the KV-SSD of FIG. 1.

FIG. 3 shows details of the KV-SSD of FIG. 1. In FIG. 3, KV-SSD 125 may include host interface logic (HIL) 305, SSD controller 310, and various flash memory chips 315-1 through 315-8 (also termed "flash memory storage"), which may be organized into various channels 320-1 through 320-4. Host interface logic 305 may manage communications between KV-SSD 125 and other components (such as processor 110 of FIG. 1) Host interface logic 305 may also manage communications with devices remote from KV-SSD 125: that is, devices that may not be considered part of device 105, but in communication with KV-SSD 125: for example, over one or more network connections. These communications may include read requests to read data from KV-SSD 125, write requests to write data to KV-SSD 125, and delete requests to delete data from KV-SSD 125. Host interface logic 305 may manage an interface across only a single port, or it may manage interfaces across multiple ports. Alternatively, KV-SSD 125 may include multiple ports, each of which may have a separate host interface logic 305 to manage interfaces across that port. The disclosed systems may also include a mix of the above embodiments of the inventive concept (for example, an SSD with three ports might have one host interface logic to manage one port and a second host interface logic to manage the other two ports).

SSD controller 310 may manage the read and write operations, along with garbage collection and other operations, on flash memory chips 315-1 through 315-8 using a flash memory controller (not shown in FIG. 3).

In a block-based storage device, particularly a block-based SSD, the host may assign a logical block address (LBA) to data, which a storage device may map to a physical block address (PBA). The storage device may maintain a record of these mappings, freeing the SSD and the host from having to ensure that the host is kept up-to-date on the current PBA of data. The host may use the LBA; the storage device maps the LBA to a PBA and returns the appropriate information. If data is moved internally to the storage device (as may occur during, for example, data overwrite or garbage collection on SSDs), such data movement may occur without notifying the host (with the mapping being updated with the new PBA of the data). Such structures that map LBAs to PBAs may be termed translation layers (or, particularly in the context of SSDs and other devices that use flash storage) flash translation layers.

In contrast, KV-SSDs, as discussed above, may manage data differently from block-based storage devices. Rather than data being assigned an LBA, data (which may be referred to as a value or data value) may be assigned a key (which may be referred to as an object key). In addition to the terminology change ("object key" replacing "LBA"), there may be other differences between keys and object LBAs (and between KV-SSDs and block-based SSDs). The size of a block in a block-based SSD may be fixed at the time of manufacturer. For example, in a block-based SSD that has blocks of about 4 KB, every block is about 4 KB in size: there may be no flexibility. This fact means that LBAs are also divided into about 4 KB units to effectively map to the blocks on the SSD. KV-SSDs, on the other hand, may permit flexible sizes for the data values. For example, objects may be stored in units of sizes such as about 512 B, about 4 KB, about 8 KB, about 16 KB, and about 32 KB, to name a few possible sizes. In addition, object key sizes may also vary—for example, from about 4 B to about 255 B—as may the ordering and/or atomicity. For example, a KV-SSD may use protocols such as ATA, SAS, NVMe, etc. These arrangements permits more flexibility in how data is stored than may be offered by a block-based SSD.

Thus, instead of a flash translation layer, KV-SSD 125 might include a mapping from object key to address where the data value is stored, such as translation layer 325. Translation layer 325 may map from an object key to an address where the corresponding data is stored on KV-SSD 125. Translation layer 325 may also store additional data: for example, how large the object is (and therefore how the entire object may be stored on KV-SSD 125).

Finally, to support processing of block requests, host interface logic 305 may include block emulator 330 and/or metadata storage 335. Block emulator 330 may emulate processing of block requests using KV storage device semantics. Metadata storage 335 may be used to store metadata relating to block requests. The information that may be stored as metadata in metadata storage 335 is discussed further with reference to FIG. 12 below. While FIG. 3 shows host interface logic 305 as including block emulator 330 and metadata storage 335, various embodiments of the inventive concept may include different configurations of KV-SSD 125 that place these elements elsewhere within KV-SSD 125. For example, block emulator 330 and/or metadata storage 335 may be placed within SSD controller 310 or managed within device driver 145 of FIG. 1.

While FIG. 3 shows KV-SSD 125 as including eight flash memory chips 315-1 through 315-8 organized into four channels 320-1 through 320-4, embodiments of the inventive concept may support any number of flash memory chips organized into any number of channels. Similarly, while FIG. 3 shows the structure of a KV-SSD, other storage devices (for example, hard disk drives) may be implemented using a different structure, but with similar potential benefits, to include both security and data deduplication.

Figure 4B:
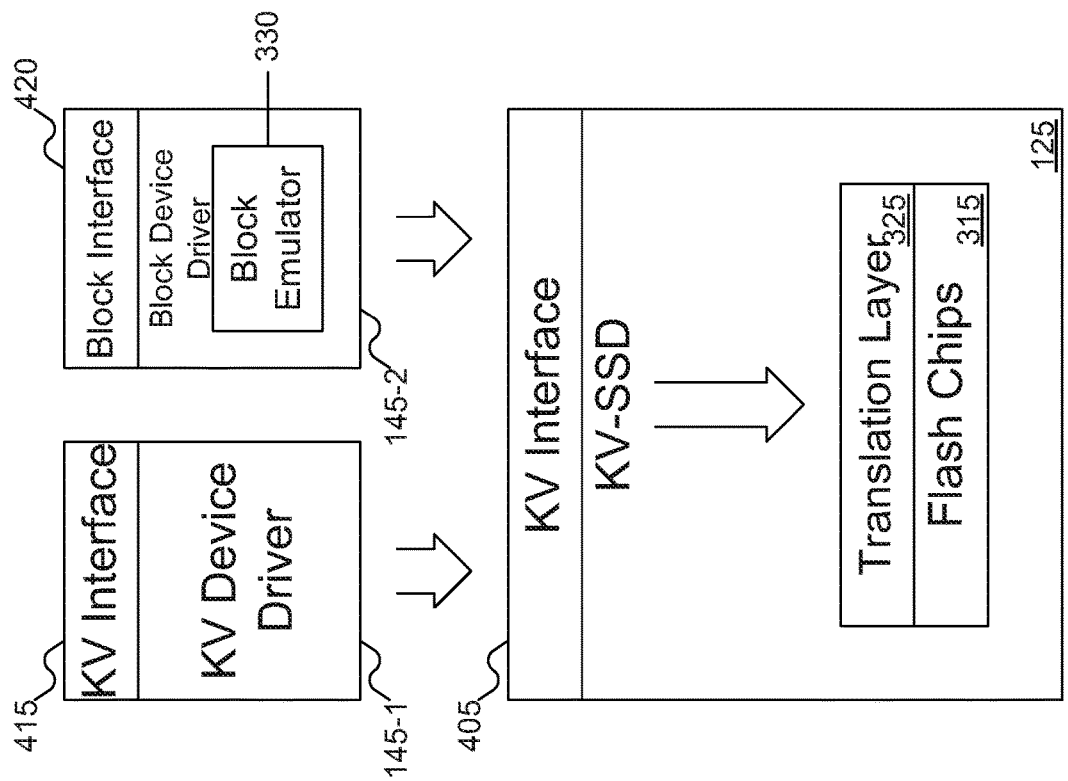
FIGS. 4A-4B show various layouts for implementing the block emulator of FIG. 3, according to embodiments of the inventive concept.
Figure 4A:
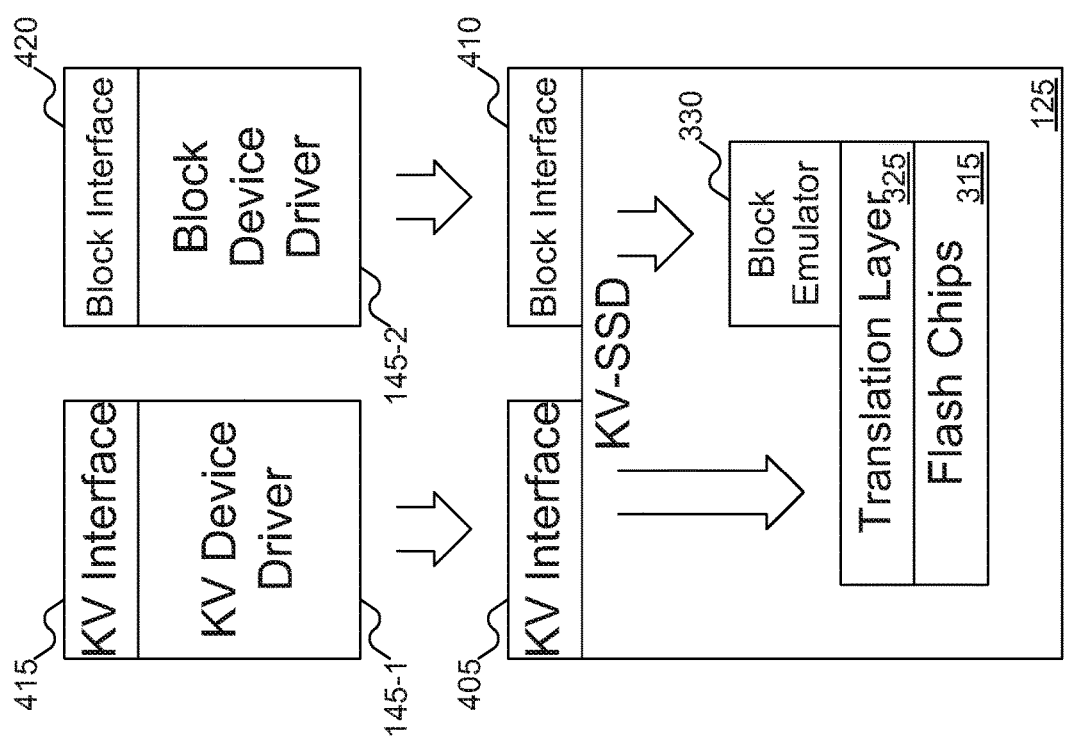

FIGS. 4A-4B show various layouts of KV-SSD 125 and device drivers 145-1 and 145-2, according to embodiments of the inventive concept. In FIG. 4A, KV-SSD 125 is shown as including flash chips 315, translation layer 325, and block emulator 330 (and also metadata storage 335 of FIG. 3, although not shown in FIG. 4A). KV-SSD 125 may also include KV interface 405 to receive KV requests and block interface 410 to receive block requests. KV interface 405 and block interface 410 may communicate with KV device driver 145-1 and block device driver 145-2, respectively, each of which may include interfaces 415 and 420 for receiving requests from processor 110 of FIG. 1 (and any software being executed therein). Note that requests received via KV interface 405 may proceed directly for processing, bypassing block emulator 330.

On the other hand, in FIG. 4B, KV-SSD 125 is shown as a conventional KV-SSD. As compared with FIG. 4A, in FIG. 4B KV-SSD 125 may omit block emulator 330 and block interface 410. Instead, block device driver 145-2 may include block emulator 330 (and also metadata storage 335 of FIG. 3, although not shown in FIG. 4B) to handle the emulation of block requests received via block interface 420 from processor 110 of FIG. 1 (and any software being executed therein). Both KV device driver 145-1 and block device driver 145-2 may issue KV requests to KV interface 405 for processing by KV-SSD 125.

Figure 5:
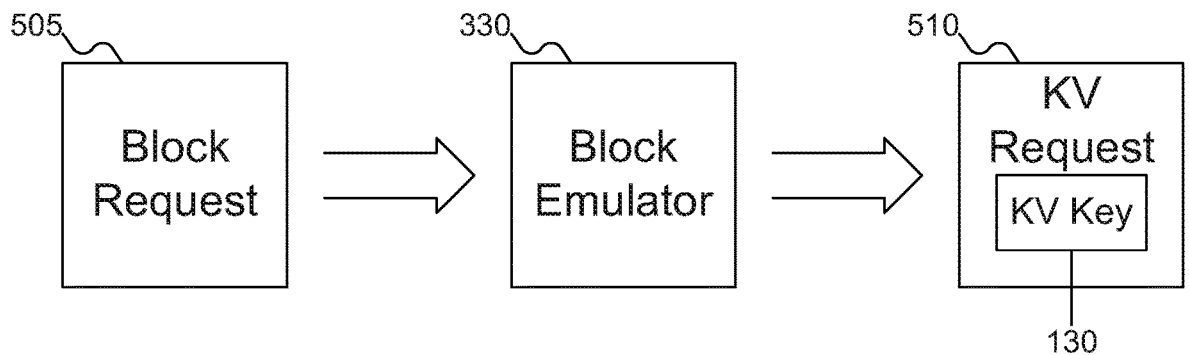
FIG. 5 shows the block emulator of FIG. 3 translating a block request into key-value requests.

FIG. 5 shows block emulator 330 of FIG. 3 translating a block request into key-value requests. In FIG. 5, block emulator 330 may receive block request 505. In the embodiments of the inventive concept described below, block request 505 may be a write request, a read request, or a trim (delete) request, but block request 505 may also include other block requests as well. In response to receiving block request 505, block emulator 330 may generate a set of KV requests 510, each of which may include key 130 (different requests may include different keys, of course). Although not shown in FIG. 5, KV request 510 may also include data to be written to KV-SSD 125 of FIG. 1, depending on the specific KV request 510 generated.

Key 130 may be generated using any suitable approach. For example, the LBA may be used without modification as the key for the object. Or, the LBA could be hashed (or otherwise manipulated) to generate key 130. In some example, key 130 may be randomly generated or assigned, with a table stored somewhere that maps a particular LBA to a particular key.

One reason that a single block request 505 might result in multiple KV requests 510 may be based on the manner in which block requests are sent. While there may be practical limitations on the amount of data to be written, read, or deleted from a storage device (for example, the physical capacity limits of the storage device), there may otherwise be no practical limit on how much data might be written, read, or deleted in a single block request.

For example, a situation may exist in which each block (as expected by processor 110 of FIG. 1 or any application being executed thereon) is about 4 KB in size. Block request 505 might request that some amount of data be written to, say, LBA 0x1000. If the amount of data to be written is actually about 8 KB in size, this amount of data may span two blocks on a block-based storage device: the block at address 0x1000 and the block at address 0x2000. Similarly, larger amounts of data that span more than two blocks may also be written by processor 110 of FIG. 1. Block-based storage devices may handle such requests.

One straightforward implementation for block emulator 330 may be to assign keys to data based on the LBA provided in the write request. Thus, KV request 510 may use the key 0x1000 to store the about 8 KB of data.

One issue with this approach may occur when processor 110 of FIG. 1 issues a request that affects some of the data that was written in this request, but in a different block than LBA 0x1000. For example, consider a situation that may occur where processor 110 of FIG. 1 issues a request to read the data at LBA 0x2000. Block-based storage devices may handle such requests: whatever data is stored at the specified LBA may be read and returned to processor 110 of FIG. 1. But when block emulator 330 attempts to determine the key associated with LBA 0x2000, no such key may be found (since no block request with that particular LBA has been received by KV-SSD 125 of FIG. 1), and block emulator 330 may return an error. This issue may be exacerbated if processor 110 of FIG. 1 attempts to write "new" data to LBA 0x2000. Block emulator 330 would see this block write request as storing data at an LBA that had not been written to before. Thus, KV-SSD 125 of FIG. 1 might end up storing data for LBA 0x2000 in two different objects: once in the object for LBA 0x1000 (the first block write request), and once in the object for LBA 0x2000. Thus, what data is returned from KV-SSD 125 of FIG. 1 may depend on which LBA was requested in a block read request and how much data was to be read. Further, a situation may occur wherein data for the same LBA may be stored three or more of times (written using different LBAs): in theory KV-SSD 125 of FIG. 1 could end up storing any number of different data for the "same" LBA in different objects, provided different LBAs were provided for each block write request.

Embodiments of the inventive concept include two different methodologies to store data on KV-SSD 125 of FIG. 1 that avoid the issues of the described above. One such approach, discussed with reference to FIGS. 8-10 below, may be termed the "split-merge" approach; the other approach, discussed with reference to FIGS. 11-17 below, uses metadata to manage data overlap and may be termed the Interval Tree approach.

In the split-merge approach, a single block request may be split into a number of KV write requests, each for a different LBA. That is, if block write request 505 spans multiple different blocks, block emulator 330 may split the request into multiple separate KV write requests, each of which may be used to write data for a different block. (Note that how many KV requests are generated may depend on both the size of the data being written in the block write request and the size of an individual block, which may be user-defined, and may even be variable for different users or different applications.) Similarly, a block read request that may span multiple blocks may be split into multiple different KV read requests, one for each affected block, after which the data from the individual KV read requests may be merged to generate the result of the block read request. (Again, the number of different KV read requests may depend on the amount of data to be read and the defined size of an individual block.) A block trim request may also result in multiple KV delete requests (again, depending on the amount of data to be deleted and the defined size of an individual block).

Using the split-merge approach a given block operation that involves n blocks may be divided into n KV operations, with the results merged together afterward. And the split-merge approach may work well when the workload involves many small random writes (that is, there is little pattern to what LBAs will be requested next given the transaction history, and each transaction tends to involve no more than a few blocks at a time). But some workloads may not meet these criteria.

The Interval Tree approach may work for workloads that involve sequential writes, such as logs. Instead of storing each block as a separate object, a single object may store data for multiple objects. An interval tree may be used to track which objects include data for which blocks. The interval tree may then be used to determine whether a particular block operation involves any overlap with existing objects: those objects may then be identified and processed as needed.

For example, to handle a block write request, there may be at least two possibilities. In a first case, the new LBAs may not overlap any existing blocks already stored on KV-SSD 125 of FIG. 1; in another case, there may be some overlap. If there is no overlap, then the new data may be stored in an object with a newly selected key, and a new node inserted into the interval tree. If there is some overlap, then the existing objects that overlap the new range of addresses may be updated to eliminate the overlapped addresses, and the interval tree may be updated to reflect the updates to the objects on KV-SSD 125 of FIG. 1. At this point, there may be no overlap with any existing objects, so a new object may be added to KV-SSD 125 of FIG. 1 and a new node added to the interval tree.

To handle a block read request or a block trim request, the interval tree may be searched to locate all objects that overlap the requested range of addresses. Those objects may be read or deleted; if read, the data may be parsed (if only a part of the object is needed) and the remaining data may then be returned to the requestor.

Note that if the interval tree does not include all blocks in the specified range of addresses for a block read request or block trim request, block emulator 330 may return an error. This behavior may be different from block-based storage devices, which may read data even from blocks that do not currently store data: but this behavior change may be considered a security enhancement. For example, an intruder might be probing KV-SSD 125 of FIG. 1 to determine what data is found on KV-SSD 125 of FIG. 1. If a number of improperly formed block read requests received exceeds a threshold (that is, too many block read requests ask for data from blocks that do not currently store data), then block emulator 330 may trigger a lockdown of KV-SSD 125 to prevent further attempts by the intruder to access data from KV-SSD 125 of FIG. 1. (Note too that this threshold number of improper block requests might be over the lifetime of KV-SSD 125 of FIG. 1, or it may be during a threshold amount of time: for example, over the most recent 5 minutes.) This lockdown may continue for a predetermined amount of time (for example, 10 minutes), during which KV-SSD 125 of FIG. 1 may not process requests from either just the intruder or from any user, or the lockdown may continue until an administrator unlocks KV-SSD 125 of FIG. 1 to permit KV-SSD 125 of FIG. 1 to again process requests.

Note that while the data structure discussed above may be referred to as an interval tree, the data structure may take any suitable form. For example, the metadata may be stored in an array or linked list instead of a tree structure. Even as a tree structure, variations are possible: the tree might be balanced or not, for example (a balanced tree may be one where for any node in the tree, the depth of the left branch from the node may be no more than one more or one less than the depth of the right branch from the node). Note too that given the operations performed on the interval tree, a more specific interval tree structure may be used. For example, for any given block address, the interval tree may include no more than one node that includes that block address. So while a general interval tree may be able to identify any number of intervals that include a specific address, the interval tree used in embodiments of the inventive concept may not need to handle this more general problem. That is, the interval tree in question may not need to identify more than one interval that overlaps any particular block address. The structure of the metadata is discussed further with reference to FIGS. 7, 12, and 17 below.

When data is written to KV-SSD 125 of FIG. 1, a node may be inserted into the interval tree. When data is deleted from KV-SSD 125 of FIG. 1, a node may be removed from the interval tree. How these operations are performed is discussed further with reference to FIGS. 12 and 17 below.

Figure 6:
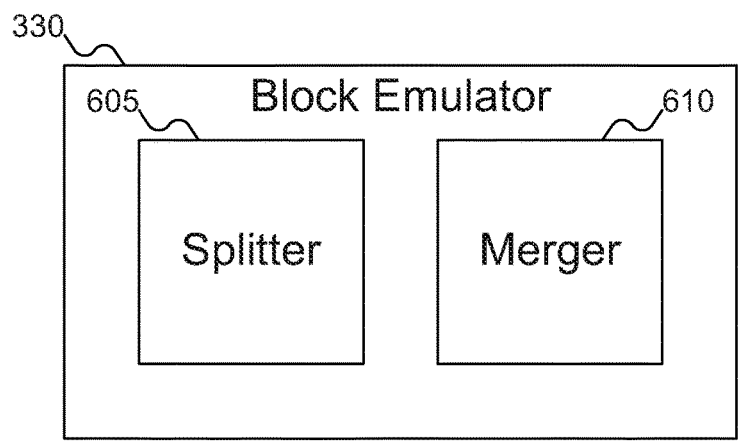
FIG. 6 shows some additional details of the block emulator of FIG. 3, according to embodiments of the inventive concept.

FIG. 6 shows details of block emulator 330 of FIG. 3, according to embodiments of the inventive concept. As shown in FIG. 6, block emulator 330 may include splitter 605 and merger 610. As discussed above, in some embodiments of the inventive concept, a single block request 505 of FIG. 5 may result in multiple KV requests 510 of FIG. 5, one for each LBA affected by block request 505 of FIG. 5. Splitter 605 may generate a KV request for blocks involved in the block request, and merger 610 may combine the results of those individual operations into a single result. (Not shown in FIG. 6 is a batch processor, which may manage the batch operation of all the individual KV requests generated by splitter 605). Alternatively, splitter 605 may generate one or more KV requests, but not necessarily the same number as the number of blocks involved in the block request. For example, in the interval tree approach, a single block request—whether a block write request, a block read request, or a block trim request—may involve one or more KV write requests (if any objects are being modified to delete some of their head or tail data), one or more KV read requests (to read objects that are being modified), and one or more KV delete requests (to delete objects that are being completely overwritten). Splitter 605 may be responsible for generating these various KV requests, with merger 610 being responsible for combining any results for delivery back to the requestor of the block request.

Figure 7:
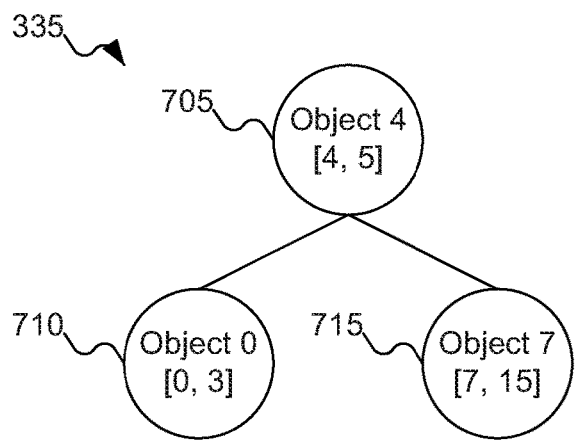
FIG. 7 shows some details of the metadata stored in the metadata storage of FIG. 3, according to embodiments of the inventive concept.

FIG. 7 shows details of the metadata stored in metadata storage 335 of FIG. 3, according to embodiments of the inventive concept. In FIG. 7, an example interval tree is shown. In this example interval tree, three nodes are shown, representing three objects. Node 705 may represent an object identified as object 4 (which may be the key used to access the object from KV-SSD 125 of FIG. 1, or the associated key may be stored within node 705 in addition to or instead of the object identifier), which may be shown as storing data spanning blocks 4-6. Node 710 may represent an object identified as object 0, which may be shown as storing data spanning blocks 0-3. And node 715 may represent an object identified as object 7, which may be shown as storing data spanning blocks 7-15. Note that the example interval tree shown in FIG. 7 may be a balanced tree, but as discussed above an unbalanced tree, another type of tree, or another data structure, may be used to store the same information.

Figure 8:
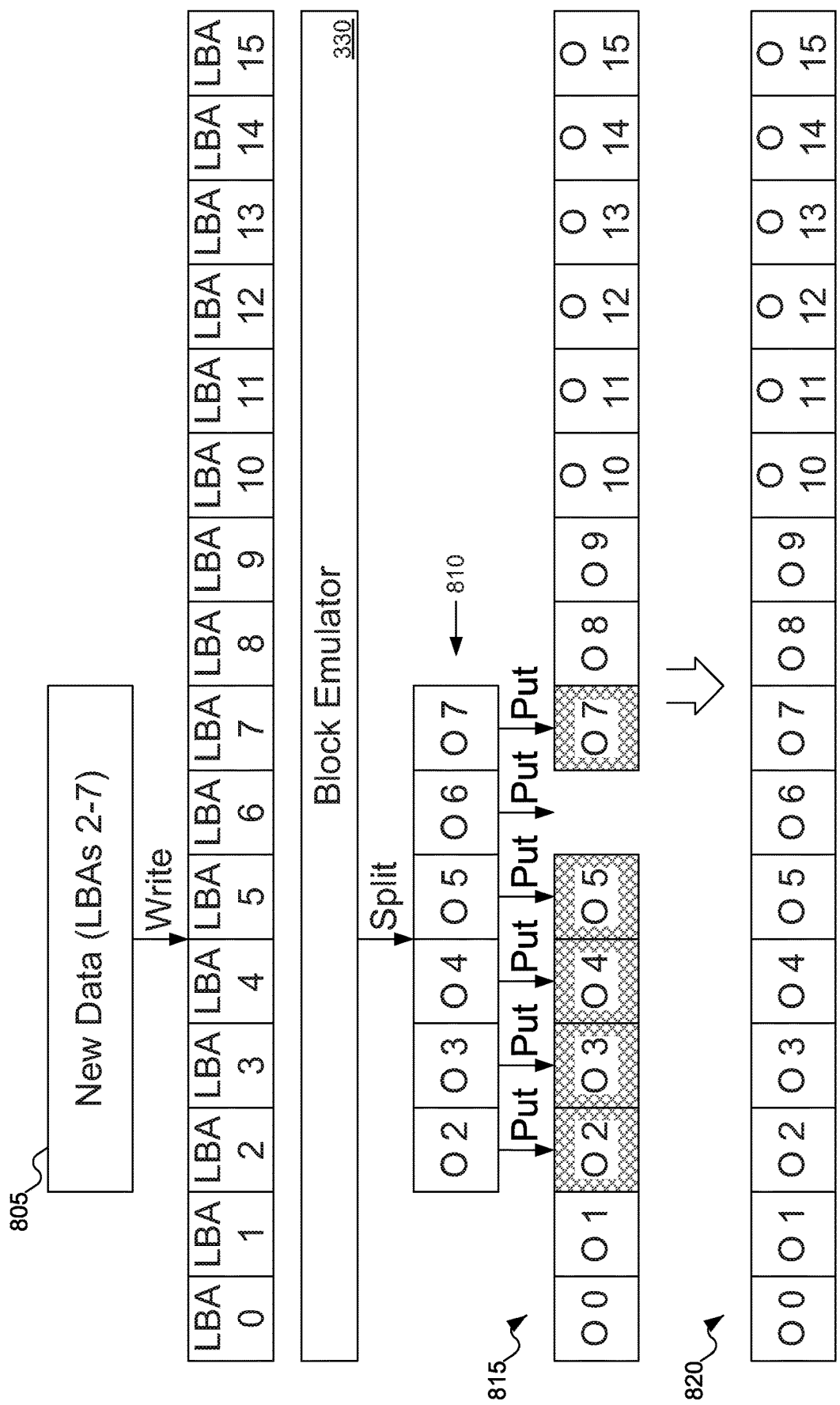
FIG. 8 shows some example operations associated with processing of a block write request, according to one embodiment of the inventive concept.
Figure 9:
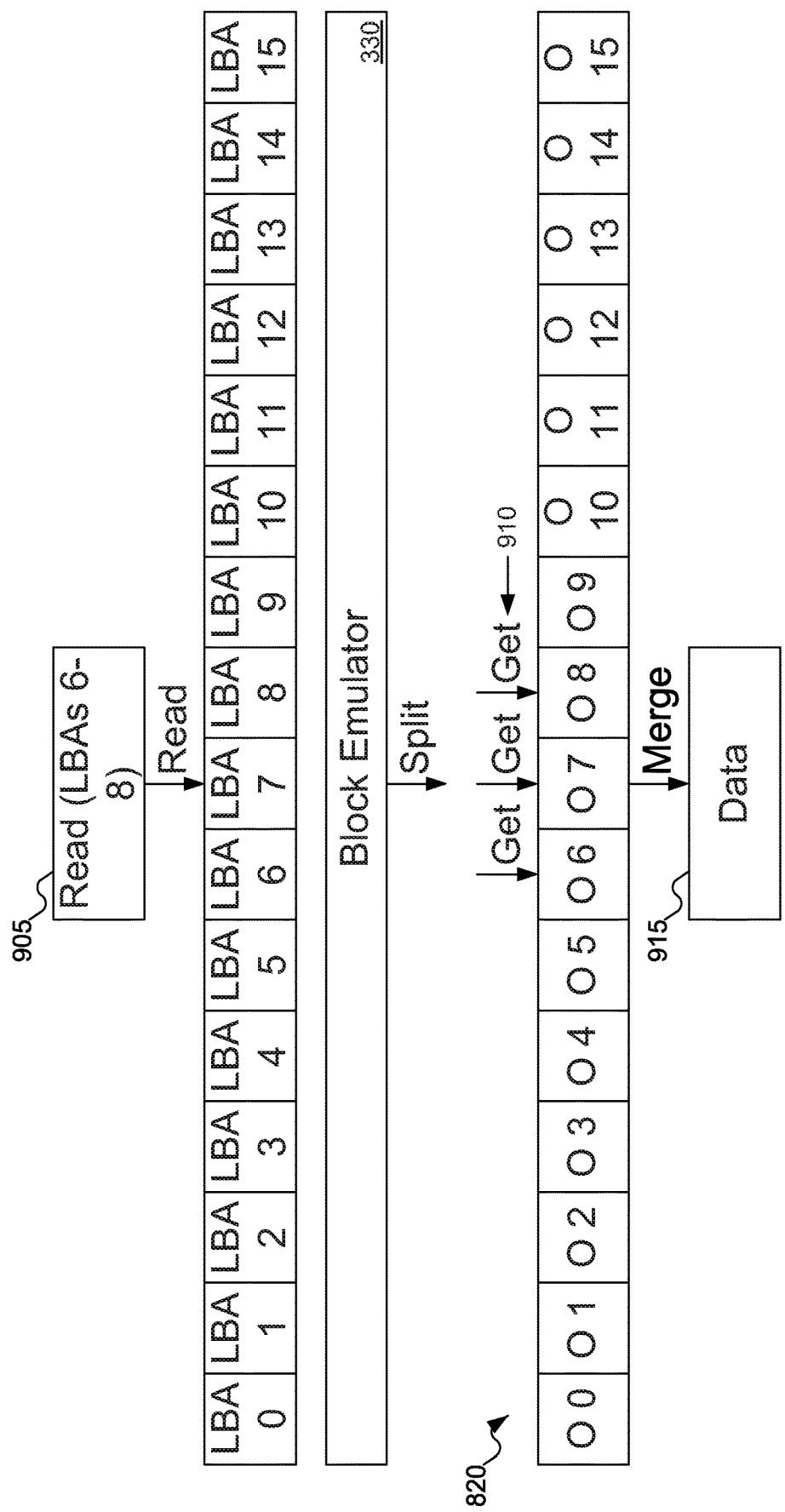
FIG. 9 shows some example operations associated with processing of a block read request, according to one embodiment of the inventive concept.
Figure 10:
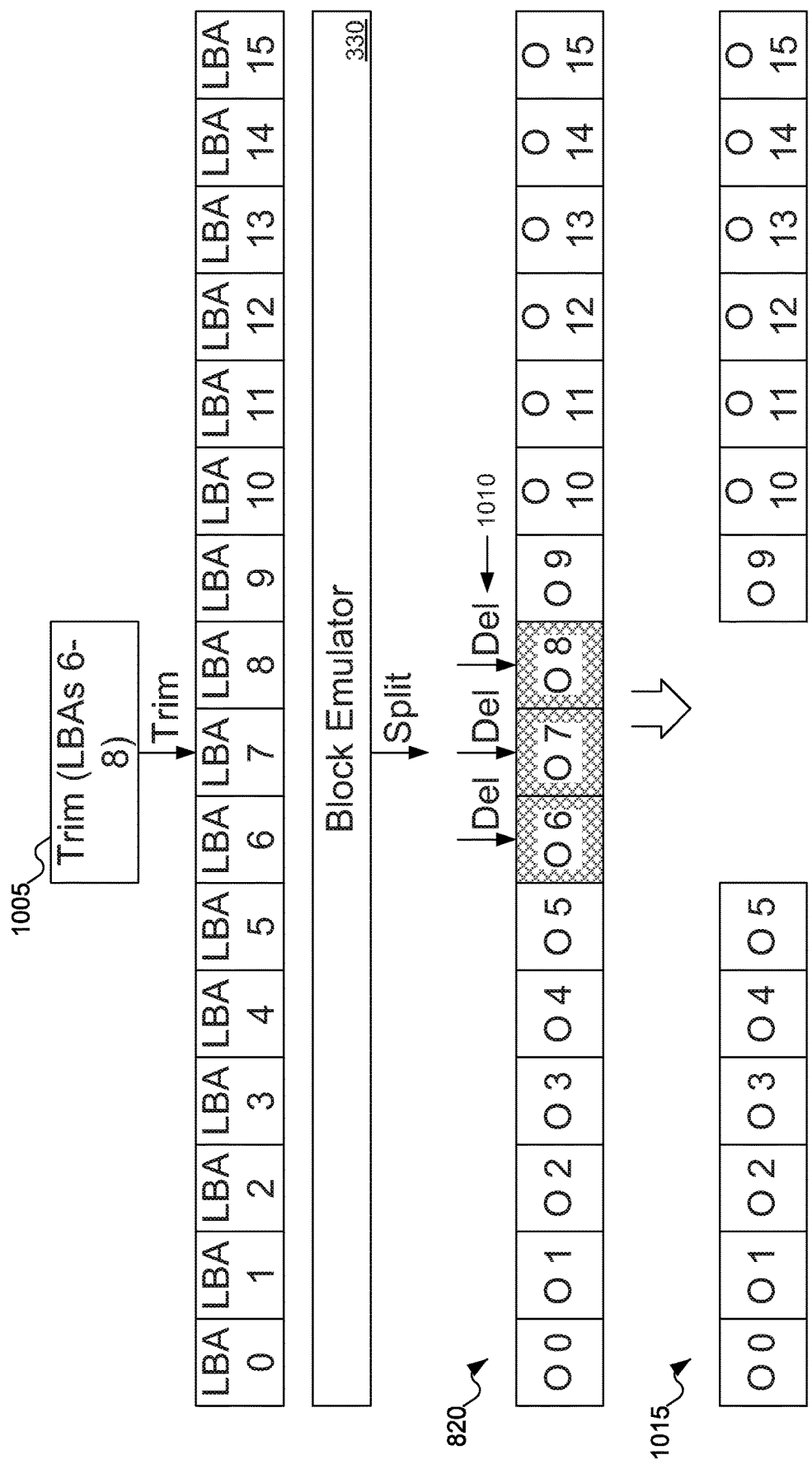
FIG. 10 shows some example operations associated with processing of a block trim request, according to one embodiment of the inventive concept.

In FIGS. 8-10, an embodiment of the inventive concept where each block may be stored as a separate object on KV-SSD 125 of FIG. 1 is shown. FIG. 8 shows an example processing of a block write request, according to one embodiment of the inventive concept. In FIG. 8, block write request 805 is shown, requesting that data be written to blocks 2-7. Block emulator 330 (more specifically, splitter 605 of FIG. 6) may split block write request 805 into six individual KV PUT requests, one for each of blocks 2-7, as shown by KV PUT requests 810. KV PUT requests 810 may then be processed using a batch processor, as discussed above with reference to FIG. 6.

Note that data is already stored in "blocks" 0-5 and 7-15, as shown in original data 815. The result of the six KV PUT requests ends up overwriting the data in "blocks" 2-5 and 7 (as shown by the crosshatching of these objects in original data 815). The result of performing the six KV PUT requests may be shown in modified data 820.

FIG. 9 shows an example processing of a block read request, according to one embodiment of the inventive concept. Continuing the example from FIG. 8, modified data 820 is shown, and block emulator 330 is shown receiving block read request 905, requesting the data from "blocks" 6-8. Block emulator 330 (more specifically, splitter 605 of FIG. 6) may split block read request 905 into three KV GET requests, as shown by KV GET requests 910. KV GET requests 910 may then be processed using a batch processor, as discussed above with reference to FIG. 6. Once the data may be read from the individual objects using KV GET requests 910, merger 610 of FIG. 6 may merge the data together, to produce data 915 requested by block read request 905.

FIG. 10 shows an example processing of a block trim request, according to one embodiment of the inventive concept. Continuing the example from FIGS. 8-9, modified data 820 is shown, and block emulator 330 is shown receiving block trim request 1005, requesting that the data in "blocks" 6-8 be deleted. Block emulator 330 (more specifically, splitter 605 of FIG. 6) may split block trim request 1005 into three KV DELETE requests, as shown by KV DELETE requests 1010. KV DELETE requests 1010 may then be processed using a batch processor, as discussed above with reference to FIG. 6. Once the objects representing "blocks" 6-8 may be deleted (represented by crosshatching in modified data 820), the result may be second modified data 1015.

Figure 11:
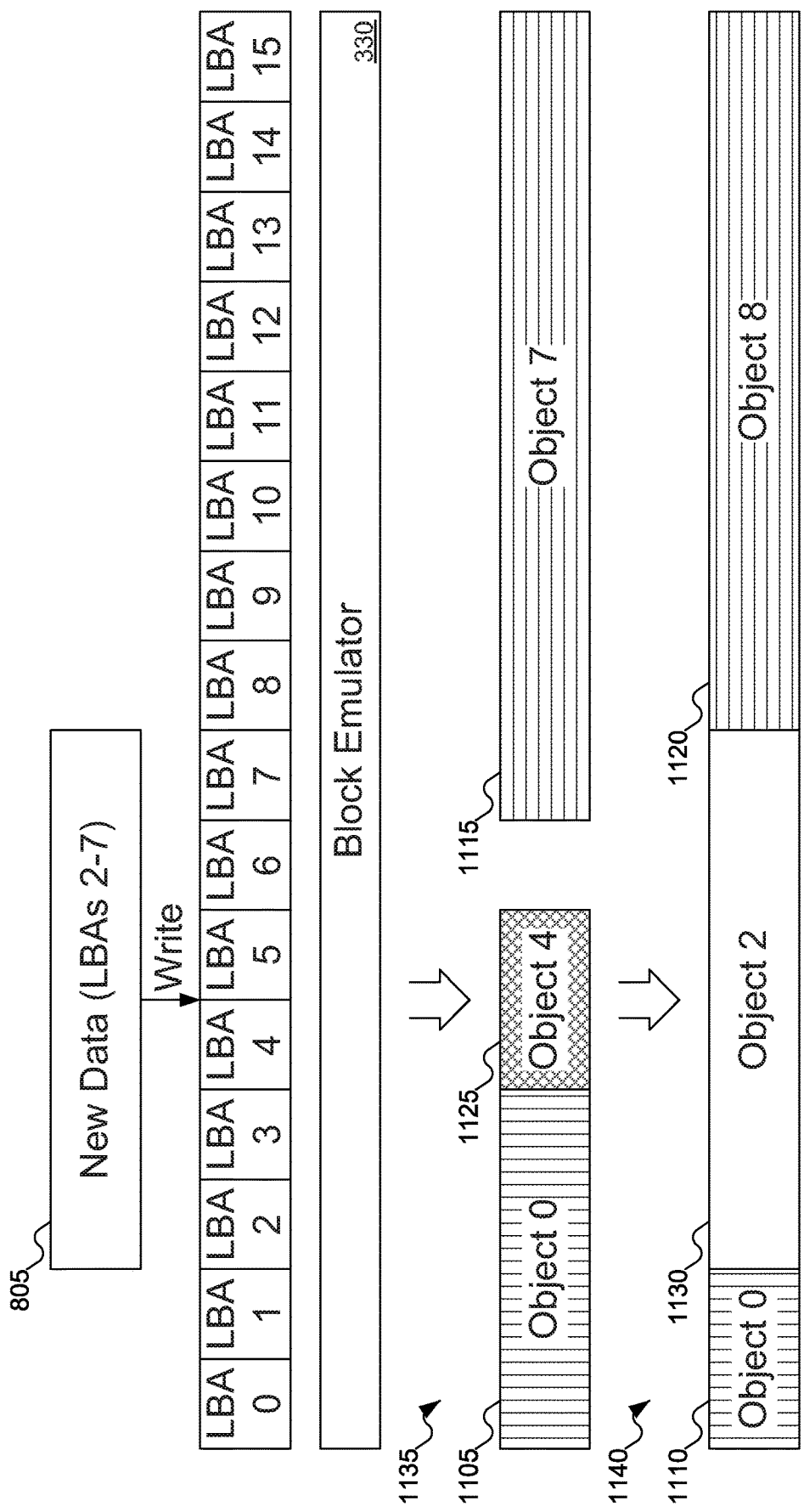
FIG. 11 shows some example operations associated with processing of a block write request, according to another embodiment of the inventive concept.

In FIGS. 11-17, an embodiment of the inventive concept where an interval tree may be used to track which objects store which "blocks" on KV-SSD 125 of FIG. 1 is shown. FIG. 11 shows an example processing of block write request 805, according to another embodiment of the inventive concept. Block write request 805 of FIG. 11 may be the same as block write request 805 of FIG. 8.

Upon receiving block write request 805, block emulator 330 may examine the metadata in metadata storage 335 of FIG. 3 (such as the interval tree) to determine which objects are affected by block write request 805. As may be seen in original data 1105 (which objects correspond to those discussed with reference to the interval tree of FIG. 7 above), there may be three objects in original data 1105 that are affected by block write request 805 (there may be additional objects not shown in either the interval tree of FIG. 7 above or in original data 1105 that may not impact the operation of block write request 805). Object 0 (shown with the horizontal hatch marks) may have some of its data at the tail of the object overwritten, object 4 (shown with the crosshatching) may be completely overwritten, and object 7 (shown with the vertical hatch marks) may have some of its data at the head of the object overwritten. Note that in general, no more than two object may have their data partially overwritten (potentially one object affected by the start of block write request 805 and potentially one object affected by the end of block write request 805), although any number (zero or more) of objects could be entirely overwritten (and therefore subject to deletion), and any number (zero or more) objects may be entirely unaffected by block write request 805.

Once the affected objects have been identified, block emulator 330 may generate the appropriate KV requests to alter the data accordingly. Since object 0 (1105) may lose some data at its tail, object 0 (1105) may be read (for example, into memory within KV-SSD 125 of FIG. 1), the appropriate data may be deleted from the data (in this case, the data representing original "blocks" 2-5), and new object (1110) (with the same key, since the original LBA of the data in the object is unchanged) may be written to KV-SSD 125 of FIG. 1. Alternatively, if KV-SSD 125 supports a request that may simply delete a portion of the data at the tail of an object (similar to a block trim request), such a request may be used instead.

Since object 7 (1115) may lose some data at its head, object 7 (1115) may be read (again, for example, into memory within KV-SSD 125 of FIG. 1), the appropriate data may be deleted from the data (in this case, the data representing original "block" 7), and the remaining data may be written back to KV-SSD 125 of FIG. 1. But since object 7 (1115) may lose some data at its head, the LBA that represents the first block of object 7 (1115) may change as a result of the data deletion. Therefore, the modified version of object 7 (1115) may be written back to KV-SSD 125 of FIG. 1 as a new object (1120) (and may now be identified as object 8) using a new object key, and original object 7 (1115) may be deleted. Alternatively, if KV-SSD 125 supports requests that may delete a portion of the data at the head of the object (similar again to a block trim request) and/or changing the key associated with an object, such requests may be used instead.

Object 4 (1125) may be completely overwritten by the data in block write request 805. Thus, block emulator 330 may simply generate a KV DELETE request to delete object 4 (1125) from KV-SSD 125 of FIG. 1.

Finally, block emulator 330 may generate a KV PUT request to write object 2 (1130) (with the new data) to KV-SSD 125 of FIG. 1. Original data 1135 and modified data 1140 may show the changes wrought by all these operations.

Figure 12:
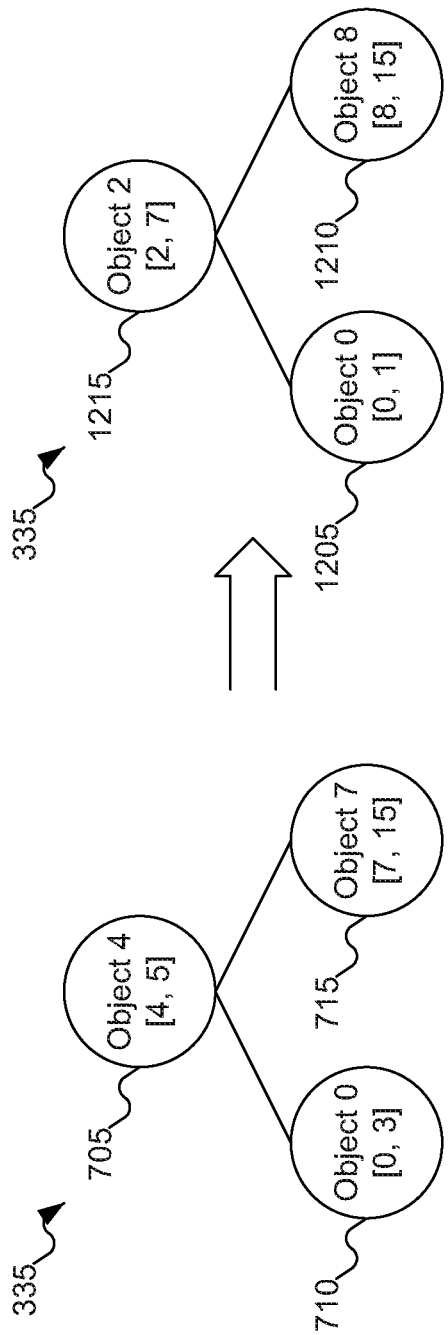
FIG. 12 shows some example operations associated with updating of the metadata of FIG. 5 responsive to the block write request of FIG. 11.

FIG. 12 shows update of the metadata of FIG. 5 responsive to block write request 805 of FIG. 11. In FIG. 12 on the left, the original metadata is shown. As discussed above, object 0 (1105) may lose two "blocks" of data at its tail, object 7 (1115) may lose one "block" of data at its head, object 4 (1125) may be deleted entirely, and new object 1130 may be added. Thus, node 710 may be modified to change the range of object 0 from spanning blocks 0-3 to spanning blocks 0-1 (as shown by node 1205), node 715 may be modified to change the range of object 7 from spanning blocks 7-15 to spanning block 8-15 (and having the object identifier changed to object 8, (as shown by node 1210), node 705 may be deleted (since object 4 (1125) may be being deleted from KV-SSD 125 of FIG. 1), and node 1215 (representing new object 2 (1130)) may be added.

Figure 13:
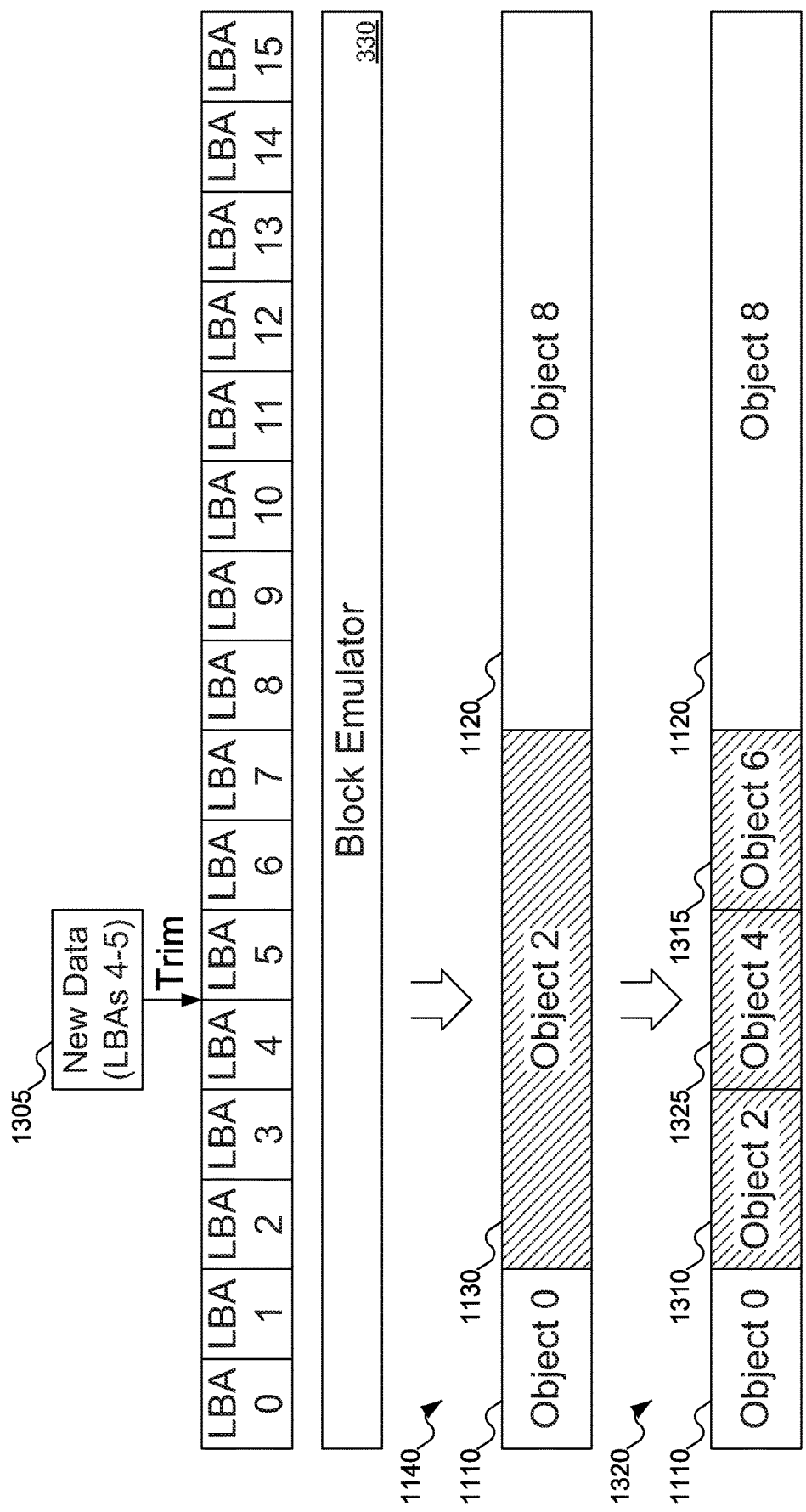
FIG. 13 shows some example operations associated with processing of a second block write request, according to another embodiment of the inventive concept.

Although in many cases data to be written may overlap an object at the head or the tail of the object (particularly if more than one object is affected), there is another possibility: the data to be overwritten may be in the middle of a single object. For example, consider FIG. 13, which continues the example of FIG. 11. In FIG. 13, block write request 1305 may be received, overwriting data in "blocks" 4-5. Since "blocks" 4-5 are strictly within object 2 (1130), there is data within object 2 (1130) that may be overwritten and data that may be left unchanged. One possibility may be to read object 2 (1130) from KV-SSD 125 of FIG. 1 (for example, into local memory within KV-SSD 125 of FIG. 1), modify the data in the middle of object 2 (1130), then write object 2 (1130) back to KV-SSD 125 of FIG. 1. This approach may avoid the need to update the metadata in metadata storage 335 of FIG. 3. But there is another approach, as shown in FIG. 13.

Block emulator 330 may read object 2 (1130) from KV-SSD 125 and may divide object 2 (1130) into three portions: one portion containing the (unmodified) head data (in the example shown in FIG. 13, this head portion may include "blocks" 2-3), one portion containing the (unmodified) tail data (in the example shown in FIG. 13, this tail portion may include "blocks" 6-7), and one portion containing the modified data (in the example shown in FIG. 13, this portion may include "blocks" 4-5). The unmodified head and tail portion may be stored as their own objects (shown as objects 2 (1310) and 6 (1315) in second modified data 1320), and the modified data may be written as its own object (shown as object 4 (1325) in second modified data 1320).

While both approaches involve potentially reading the object being modified from KV-SSD 125 of FIG. 1 and writing that object (and potentially others) back to KV-SSD 125 of FIG. 1, the second approach has an advantage: this approach may also be used when data is being deleted from the middle of an object (just instead of writing the object that contains the modified data, that object may be omitted entirely). If data may be deleted from the middle of an object, the first approach would leave a "hole" in the data (two "blocks" that do not store any data).

Figure 14:
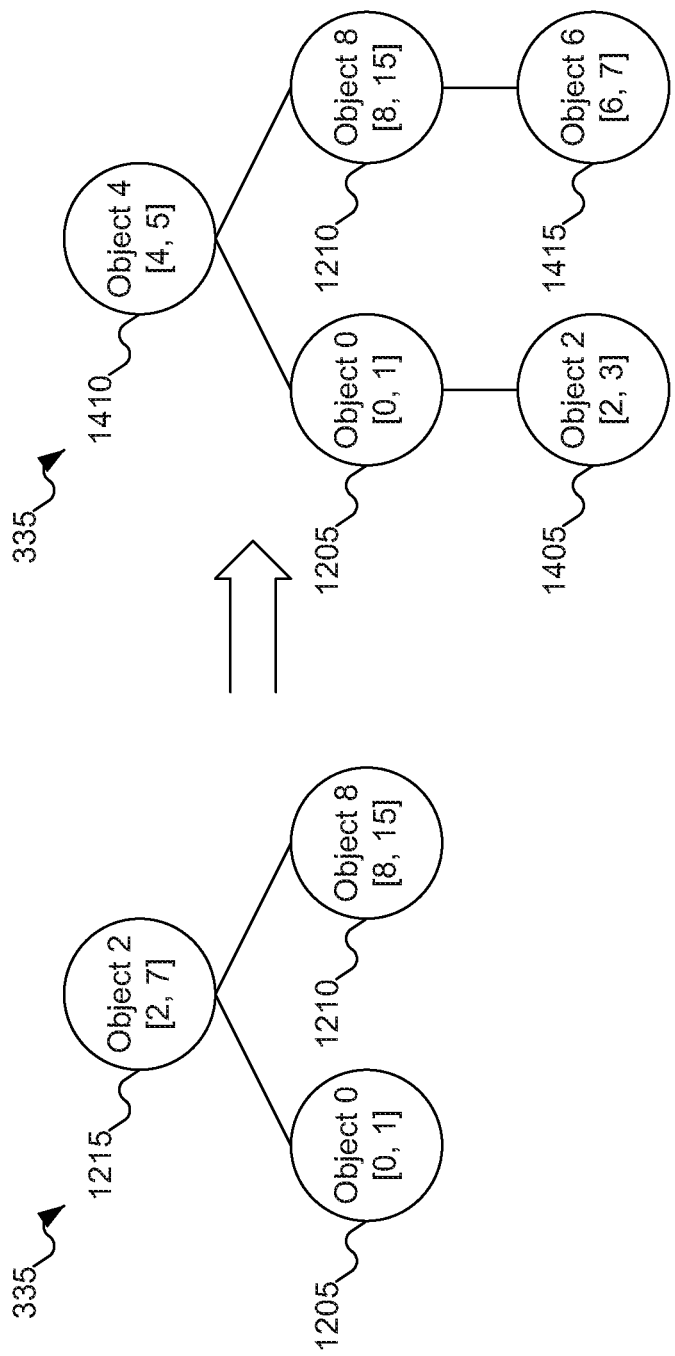
FIG. 14 shows some example operations associated with a second update of the metadata of FIG. 5 responsive to the block write request of FIG. 13.

FIG. 14 shows update of the metadata of FIG. 5 responsive to block write request 1305 of FIG. 13. In FIG. 14 on the left, the metadata prior to modification may be shown. As discussed above, object 2 (1130) may be divided into three portions, including the first two "blocks" of object 2 (1130), the new data to be written to KV-SSD 125 of FIG. 1, and the last two "blocks" of object 2 (1130); objects 0 (1110) and 8 (1120) may be unaffected by block write request 1305 of FIG. 13. Thus, node 1215 may be modified to change the range of object 2 from spanning blocks 2-7 to spanning blocks 2-3 (as shown by node 1405), and nodes 1410 (representing object 4 (1325)) and 1415 (representing object 6 (1120)) may be added to the metadata. (The interval tree shown on the right in FIG. 14 has the nodes in a different arrangement to show a balanced interval tree; other balanced tree node arrangements may also be possible; if the interval tree is not a balanced tree, still other tree node arrangements may be possible, and if another data structure is used, the arrangement of the metadata may be different.)

Figure 15:
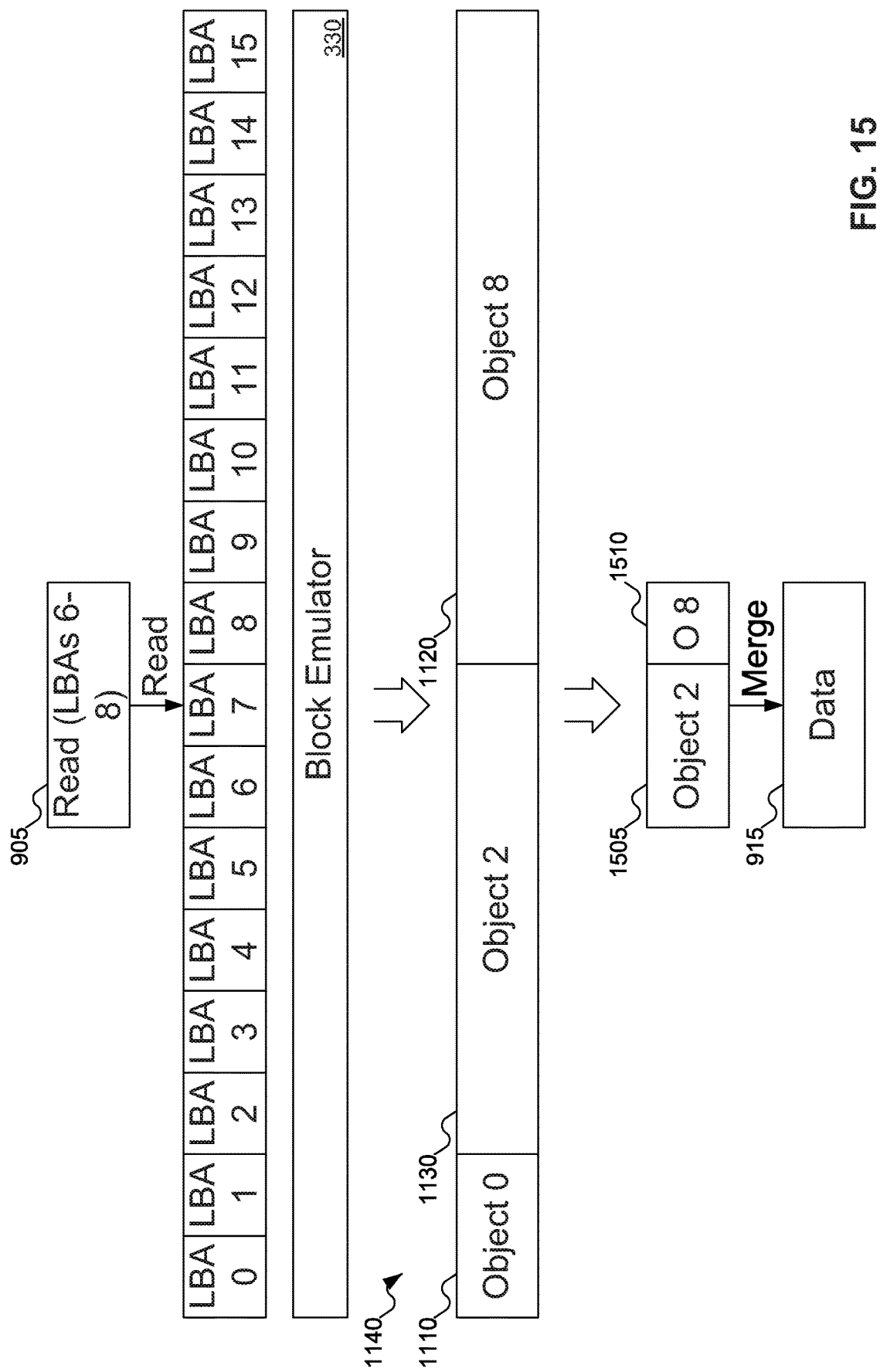
FIG. 15 shows some example operations associated with processing of a block read request, according to another embodiment of the inventive concept.

FIG. 15 shows an example processing of block read request 905, according to another embodiment of the inventive concept. Block read request 905 of FIG. 15 may be the same as block read request 905 of FIG. 9.

Upon receiving block read request 905, block emulator 330 may access the metadata from metadata storage 335 of FIG. 3 to identify the affected objects. As may be seen in modified data 1140, "blocks" 6-8 may be found in objects 2 (1130) and 8 (1120). Thus, block emulator 330 (more specifically, splitter 605 of FIG. 6) may issue KV GET requests to read objects 2 (1130) and 8 (1120). Block emulator 330 may then process the read data to extract "blocks" 6-7 from object 2 (1130) and "block" 8 from object 8 (1120) (shown as data 1505 and data 1510, respectively). Merger 610 of FIG. 6 may then merge the resulting data 1505 and 1510 to produce data 915, which may then be sent back to processor 110 of FIG. 1 (or any software executing therein that issued block read request 905).

Figure 16:
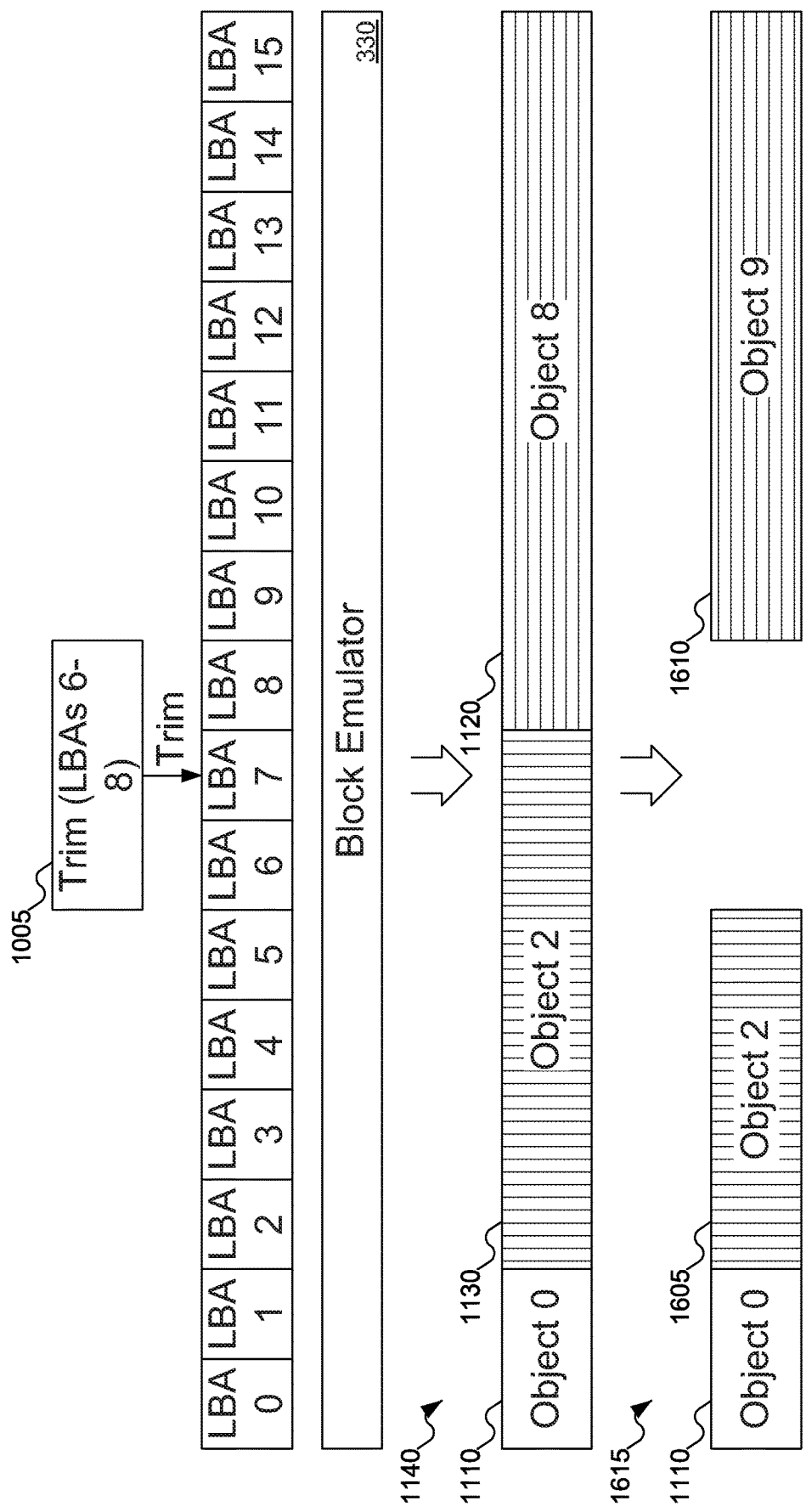
FIG. 16 shows some example operations associated with processing of block trim requests, according to another embodiment of the inventive concept.

FIG. 16 shows an example processing of block trim request 1005, according to another embodiment of the inventive concept. Block trim request 1005 of FIG. 16 may be the same as block trim request 1005 of FIG. 10.

Upon receiving block trim request 1005, block emulator 330 may access the metadata from metadata storage 335 of FIG. 3 to identify the affected objects. As may be seen in modified data 1140, "blocks" 6-8 may be found in objects 2 (1130) and 8 (1120). Thus, block emulator 330 (more specifically, splitter 605 of FIG. 6) may issue requests to read objects 2 (1130) and 8 (1120) (for example, into memory in KV-SSD 125 of FIG. 1). The data representing "blocks" 6-7 from object 2 (1130) and "block" 8 from object 8 (1120) may then be removed from the objects, which may be written back to KV-SSD 125 of FIG. 1. Note that since object 8 (1120) may lose data at its head, the LBA representing the "block" at the head of object 8 (1120) may be changed, and so the object may be assigned a new identifier (and/or a new key). The modified objects may be shown as objects 2 (1605) and 9 (1610). Objects 2 (1130) and 8 (1120) may be modified similarly to how objects 0 (1105) and 7 (1115) are modified as discussed above with reference to FIG. 11, and if KV-SSD of FIG. 7 supports requests that may directly modify the objects without reading them, modifying local copies, and writing the results back to KV-SSD 125 of FIG. 1, such requests may be used instead. Once the objects representing "blocks" 6-8 have been deleted, the result may be second modified data 1615.

Figure 17:
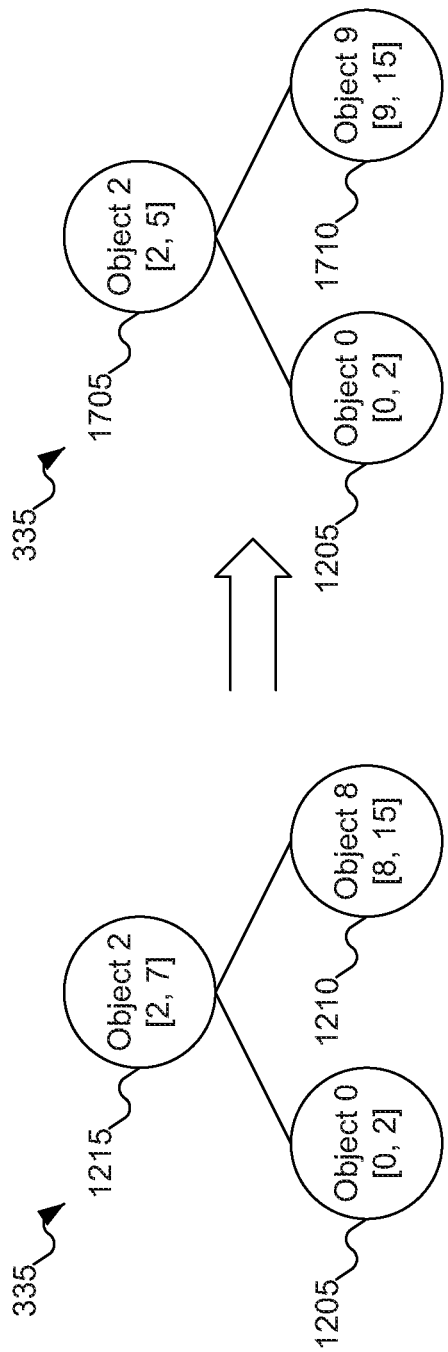
FIG. 17 shows some example operations associated with updating of the metadata of FIG. 5 responsive to the block trim requests of FIG. 16.

FIG. 17 shows update of the metadata of FIG. 5 responsive to block trim request 1005 of FIG. 16. In FIG. 17 on the left, the modified metadata may be shown. As discussed above, object 2 (1130) may lose two "blocks" of data at its tail, and object 8 (1120) may lose one "block" of data at its head. Thus, node 1215 may be modified to change the range of object 2 from spanning blocks 2-7 to spanning blocks 2-5 (as shown by node 1705), and node 1210 may be modified to change the range of object 8 from spanning blocks 8-15 to spanning block 9-15 (and may have the object identifier changed to object 9, as shown by node 1710). Object 0 (1110) may not be affected by block trim request 1005 of FIG. 16, and thus node 1205 may be unchanged in the interval tree.

Figure 18:
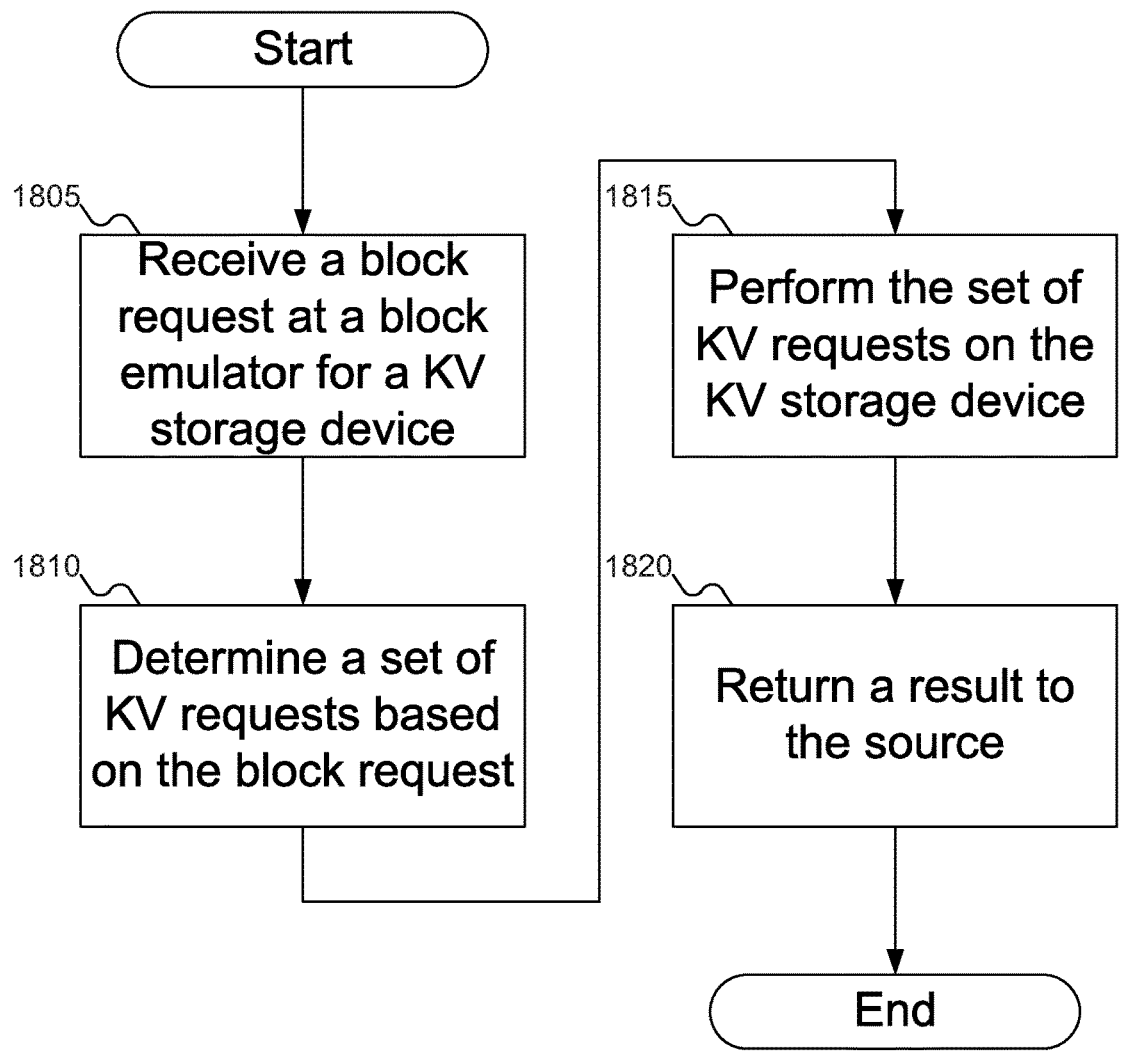
FIG. 18 shows a flowchart of an example procedure for processing block requests using the KV-SSD of FIG. 1, according to embodiments of the inventive concept.

FIG. 18 shows a flowchart of an example procedure for processing block requests using KV-SSD 125 of FIG. 1, according to embodiments of the inventive concept. In FIG. 18, at block 1805, KV-SSD 125 of FIG. 1 may receive block request 505 of FIG. 5 from processor 110 of FIG. 1 (or software executing thereon). At block 1810, block emulator 330 of FIG. 3 may determine a set (one or more) of KV requests 510 of FIG. 5 based on block request 505 of FIG. 5. At block 1815, KV-SSD 125 of FIG. 1 may perform the set of KV requests 510 of FIG. 5, and at block 1820, KV-SSD 125 of FIG. 1 may return a result to the requestor (such as an acknowledgment that the request was completed, the data requested from a read request, or an error if there was a problem carrying out the request).

Figure 19A:
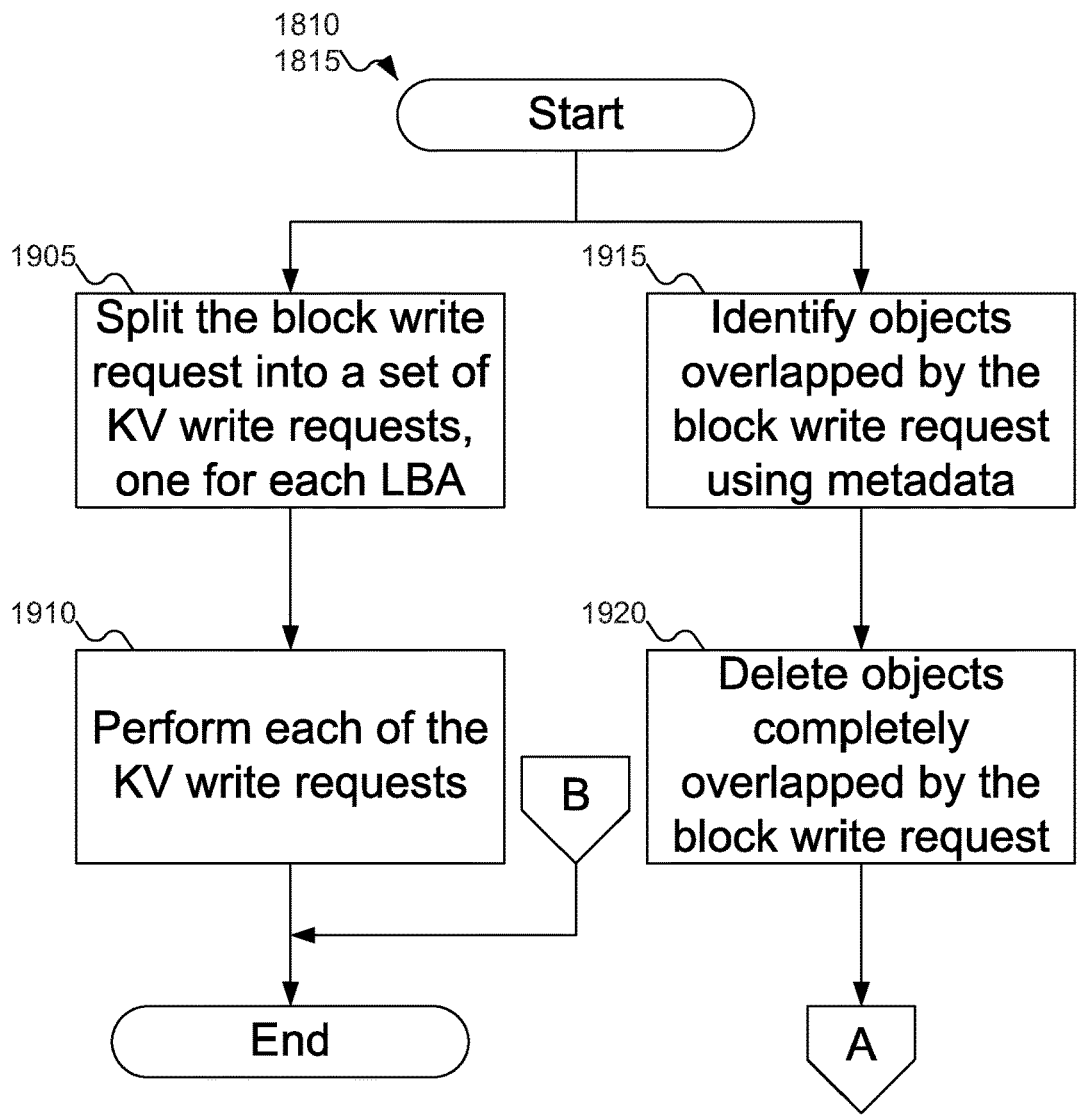
FIGS. 19A-19B show a flowchart of an example procedure for processing block write requests using the KV-SSD of FIG. 1, according to embodiments of the inventive concept.
Figure 19B:
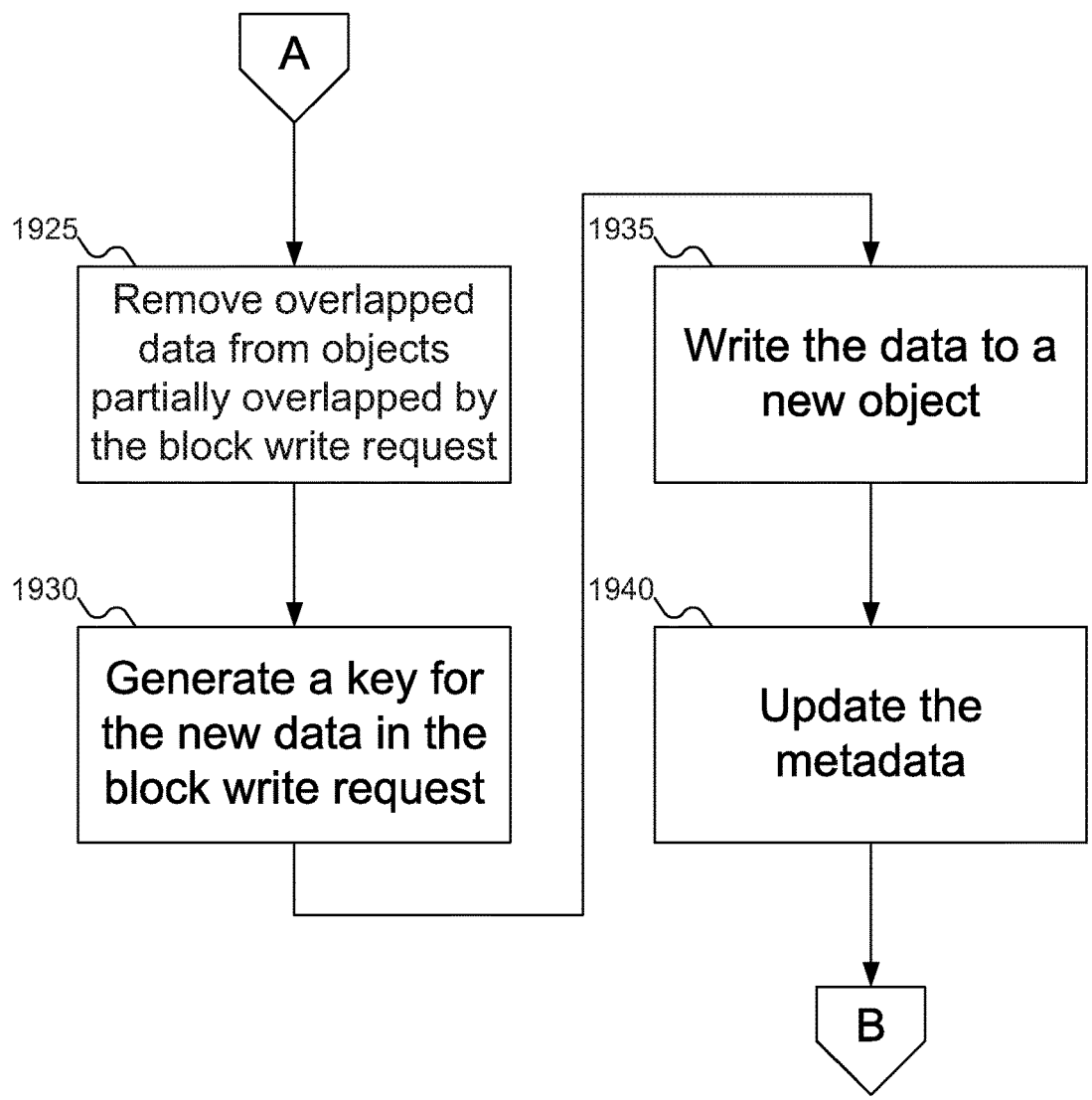

FIGS. 19A-19B show a flowchart of an example procedure for processing block write request 805 of FIG. 8 using KV-SSD 125 of FIG. 1, according to embodiments of the inventive concept. As may be seen, there are at least two possible paths for processing block request 805 of FIG. 8. According to one path (the split-merge approach), in FIG. 19A, at block 1905, splitter 605 of FIG. 6 may split block write request 805 of FIG. 8 into KV write requests 810 of FIG. 8 (one such KV write request for each "block" affected by block write request 805 of FIG. 8), and at block 1910, KV-SSD 125 of FIG. 1 may perform each of KV write requests 810 of FIG. 8.

Alternatively, (the interval tree approach), at block 1915, block emulator 330 of FIG. 3 may identify objects that are overlapped (either partially or wholly) by block write request 805 of FIG. 11. At block 1920, block emulator 330 of FIG. 3 may generate KV requests to delete objects that are wholly overlapped by block write request 805 of FIG. 8 (which KV requests may be performed by KV-SSD 125 of FIG. 1): the keys for the objects to be removed may be found in the metadata in metadata storage 335 of FIG. 3. At block 1925 (FIG. 19B), block emulator 330 of FIG. 3 may generate KV requests to remove overlapped data from objects that are partially overlapped by block write request 805 of FIG. 8 (which KV requests may be performed by KV-SSD 125 of FIG. 1): as with block 1920, the keys for these objects may be found in the metadata in metadata storage 335 of FIG. 3. At block 1930, block emulator 330 of FIG. 3 may generate key 130 of FIG. 1 for the new data to be written to KV-SSD 125 of FIG. 1. At block 1935, block emulator 330 of FIG. 3 may generate the KV request to write the new object (with key 130 of FIG. 1) to KV-SSD 125 of FIG. 1 (which KV request may be performed by KV-SSD 125 of FIG. 1). Finally, at block 1940, block emulator 330 of FIG. 3 may update the metadata in metadata storage 335 of FIG. 3 to reflect the changes implemented by the KV requests in blocks 1920, 1925, and 1935.

Figure 20A:
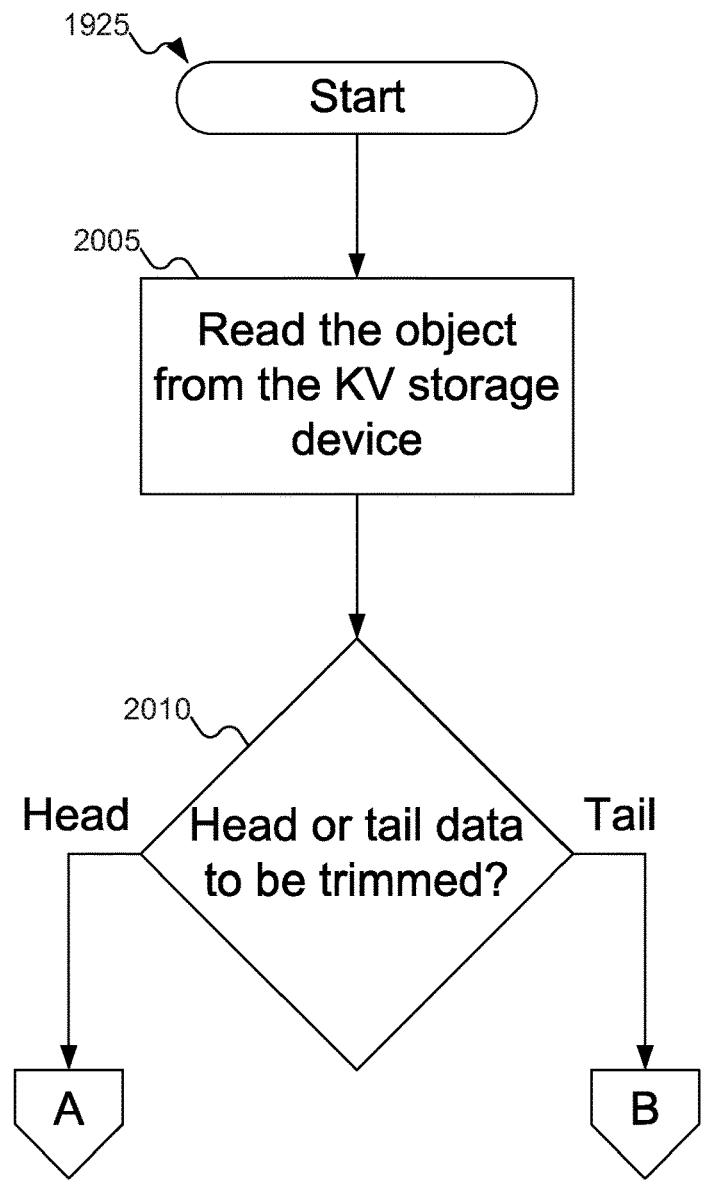
FIGS. 20A-20B show a flowchart of an example procedure for updating the metadata when processing block write requests using the KV-SSD of FIG. 1, according to embodiments of the inventive concept.
Figure 20B:
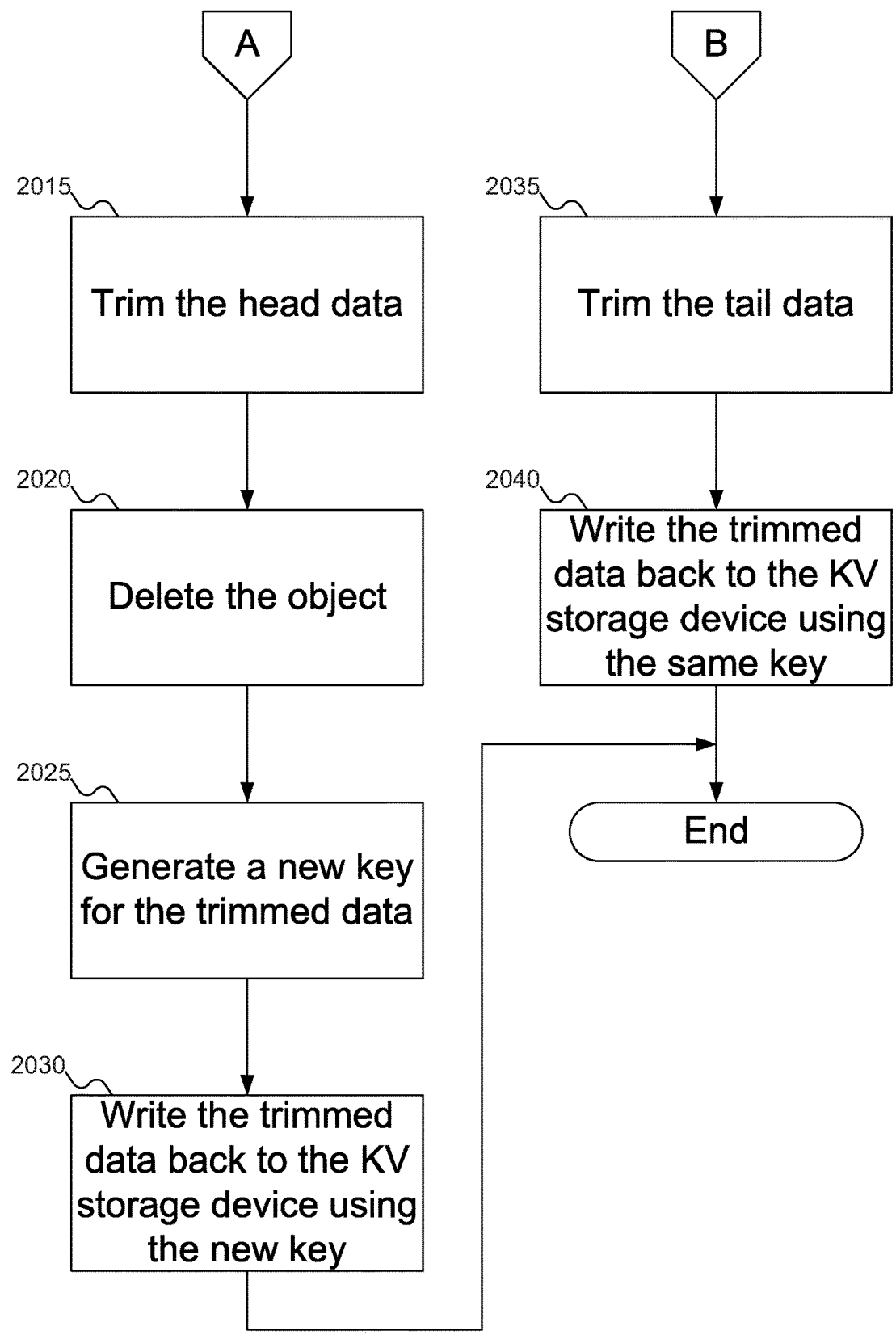

FIGS. 20A-20B show a flowchart of an example procedure for updating the metadata when processing block write request 805 of FIG. 8 using KV-SSD 125 of FIG. 1, according to embodiments of the inventive concept. In FIG. 20A, at block 2005, block emulator 330 of FIG. 3 may read the object from KV-SSD 125 of FIG. 1: the keys for the objects to be read may be found in the metadata in metadata storage 335 of FIG. 3. At block 2010, block emulator 330 of FIG. 3 may determine if data is being removed from the head or tail of the object: that is, whether the data that is overlapped may be at either the start or the end of the object.

If the data being removed may be at the head of the object, then at block 2015 (FIG. 20B) the data to be removed may be trimmed from the data read from the object. At block 2020, the original object may be deleted from KV-SSD 125 of FIG. 1: since the data for the "block" at the head of the object has been removed from the object, the LBA that represents the start of the data in that object will change, which means the key for the object will also change. At block 2025, block emulator 330 of FIG. 3 may generate a new key 130 of FIG. 1 for the object to store the trimmed data. Finally, at block 2030, block emulator 330 of FIG. 3 may issue the KV request to write the new object, with new key 130 of FIG. 1, to KV-SSD 125 of FIG. 1 (which KV request KV-SSD 125 of FIG. 1 may then perform).

Alternatively, if the data to be trimmed from the object may be at the tail of the object, then at block 2035, block emulator 330 of FIG. 3 may remove the data from the tail of the object, and at block 2040, block emulator 330 of FIG. 3 may issue the KV request to write the modified data back to the object.

As discussed above with reference to FIGS. 13-14, there may also be situations in which data is modified in the middle of an object. In such situations, the sequences shown in blocks 2015-2030 and 2035-2040 may modified and combined to achieve the result. For example, the (unmodified) tail data may be separated from the rest of the data and written as its own object (similar to what is described for blocks 2015 and 2025-2030), the (unmodified) head data may be retained (and the other data deleted as unwanted tail data as in blocks 2035-2040) as the original object, and then a new object may be written containing the newly modified data (as in block 1935 of FIG. 19B).

Figure 21A:
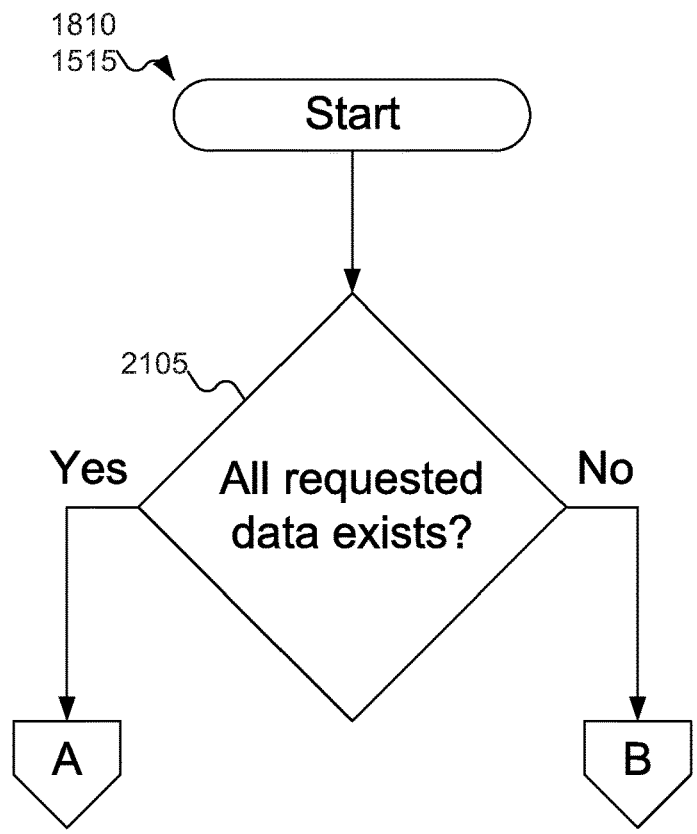
FIGS. 21A-21C show a flowchart of an example procedure for processing block read requests using the KV-SSD of FIG. 1, according to embodiments of the inventive concept.
Figure 21B:
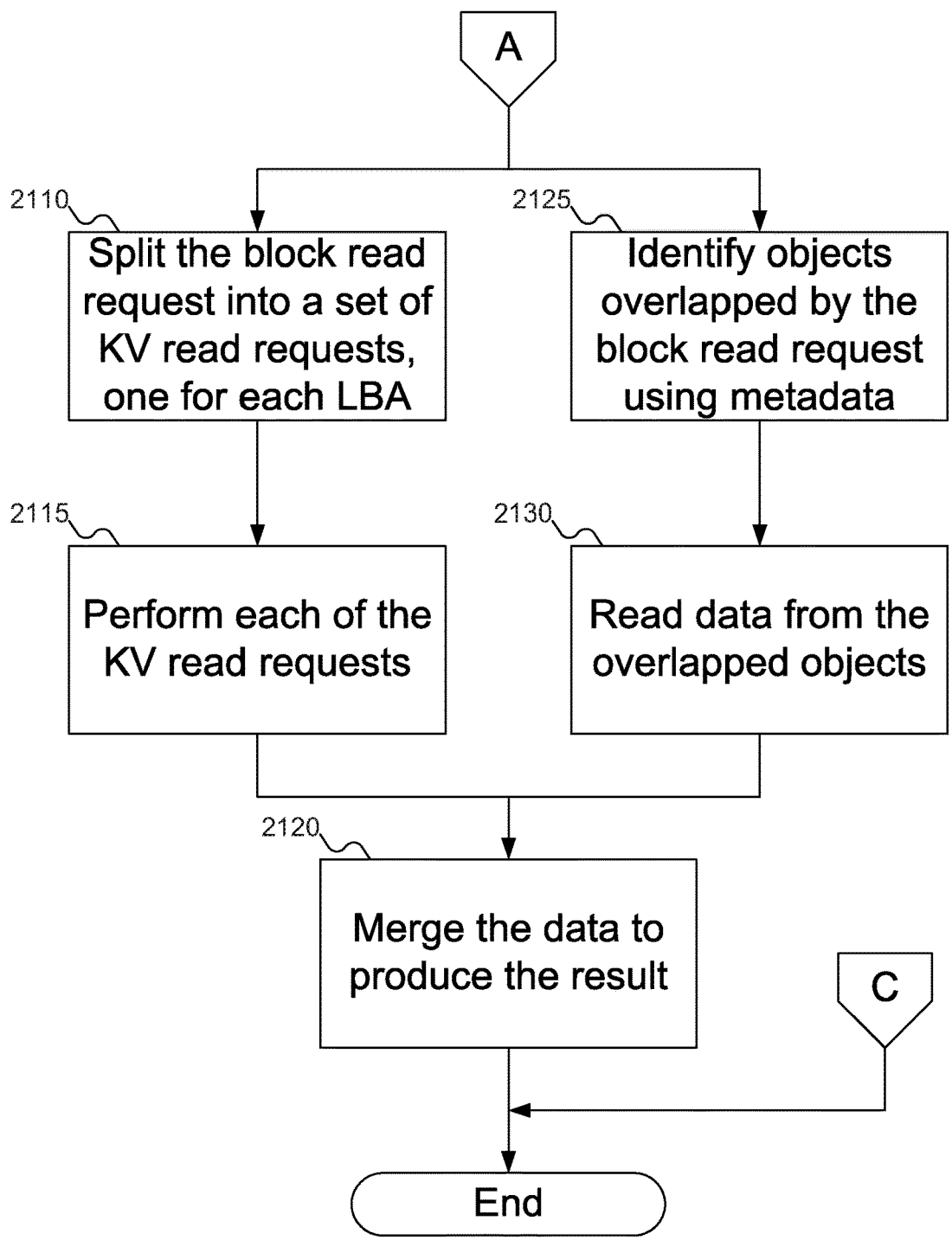
Figure 21C:
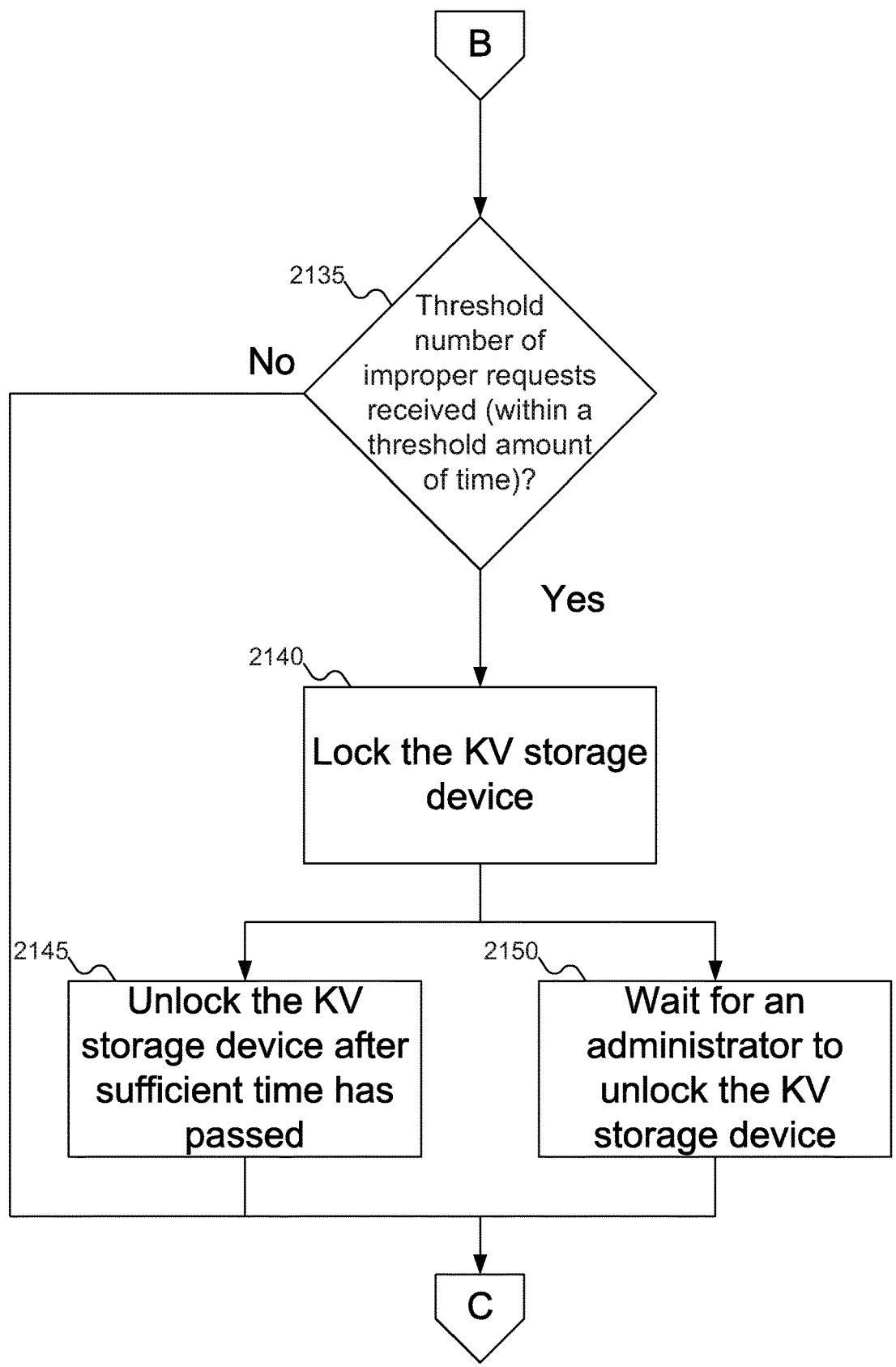

FIGS. 21A-21C show a flowchart of an example procedure for processing block read request 905 of FIGS. 9 and 15 using KV-SSD 125 of FIG. 1, according to embodiments of the inventive concept. In FIG. 21A, at block 2105, block emulator 330 of FIG. 3 may check to see if the requested data exists on KV-SSD 125 of FIG. 1. Note that this check may not be required: if some data may not currently stored on KV-SSD 125 of FIG. 1, block emulator 330 of FIG. 3 may fill in the "missing" data with any suitable values, such as all zeros, all ones, or random data. The check shown in block 2105 is beneficial in that it enables enhanced security by detecting when someone is attempting to read data that is not actually present on KV-SSD 125 of FIG. 1: KV-SSD 125 of FIG. 1 may then be locked to prevent such access. Note that this check may be completed without actually accessing the objects on KV-SSD 125 of FIG. 1: this check may be performed by accessing the metadata from metadata storage 335 of FIG. 3.

If the requested data may not be present on KV-SSD 125 of FIG. 1, then as may be seen in FIG. 21B, there are at least two possible paths for processing read request 905 of FIGS. 9 and 15. According to one path (the split-merge approach), at block 2110 (FIG. 21B), splitter 605 of FIG. 6 may split block read request 905 of FIG. 9 into KV read requests 910 of FIG. 9 (one such KV read request for each "block" affected by block read request 905 of FIG. 9). At block 2115, KV-SSD 125 of FIG. 1 may perform each of KV read requests 910 of FIG. 9. Finally, at block 2120, merger 610 of FIG. 6 may merge the data read by KV read requests 910 of FIG. 9 to produce a result that may be returned back to the requestor.

Alternatively, (the interval tree approach), at block 2125, block emulator 330 of FIG. 3 may identify objects that are overlapped (either partially or wholly) by block read request 905 of FIG. 15. At block 2130, block emulator 330 of FIG. 3 may generate KV requests to read objects that are partially or wholly overlapped by block read request 905 of FIG. 15 (which KV requests may be performed by KV-SSD 125 of FIG. 1): the keys for the objects to be read may be found in the metadata in metadata storage 335 of FIG. 3. Then, at block 2120, merger 610 of FIG. 6 may (as above) merge the data read from the overlapped objects to produce a result that may be returned back to the requestor.

If all the requested data is present on KV-SSD 125 of FIG. 1, then at block 2135 (FIG. 21C) block emulator 330 of FIG. 3 may check to see if a threshold number of improper requests have been received. Note that the check in block 2135 may measure the number of improper requests since KV-SSD 125 of FIG. 1 was first powered up (or last powered up), or the check in block 2135 may measure the number of improper requests within a threshold interval of time (for example, the past five minutes). If the threshold number of improper inquiries has been met, then at block 2140 block emulator 330 of FIG. 3 may lock KV-SSD 125 of FIG. 1. At block 2145, block emulator 330 of FIG. 3 may unlock KV-SSD 125 of FIG. 1 after a threshold amount of time has passed (for example, five minutes). Alternatively, at block 2150, KV-SSD 125 of FIG. 1 may remain locked until an administrator unlocks KV-SSD 125 of FIG. 1.

Figure 22A:
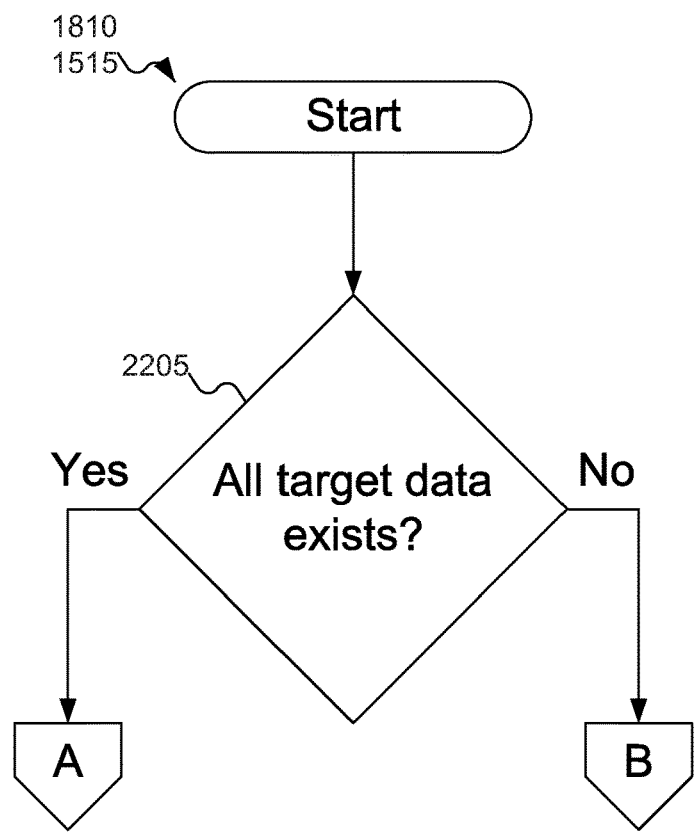
FIGS. 22A-22C show a flowchart of an example procedure for processing block trim requests using the KV-SSD of FIG. 1, according to embodiments of the inventive concept.
Figure 22B:
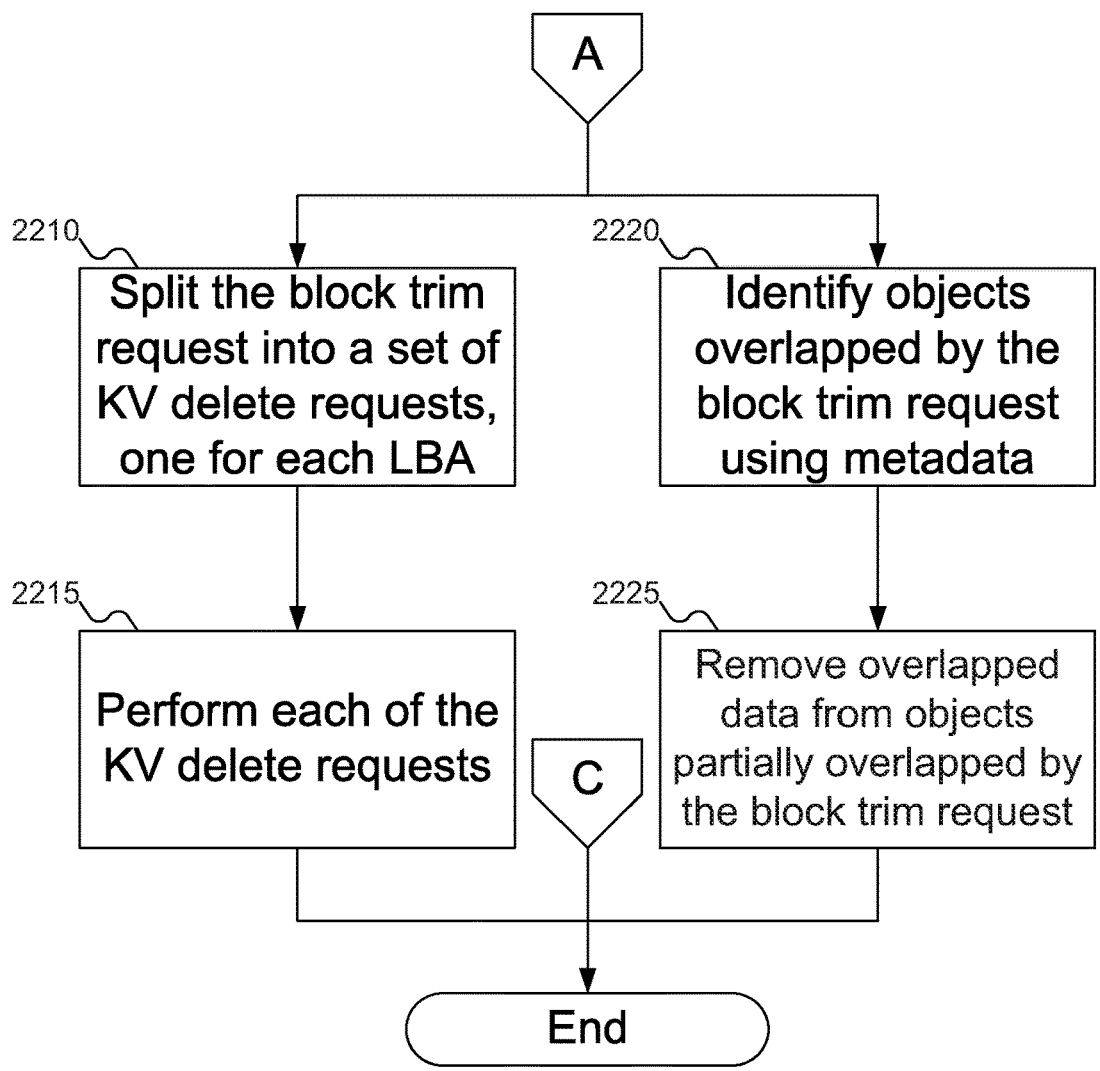
Figure 22C:
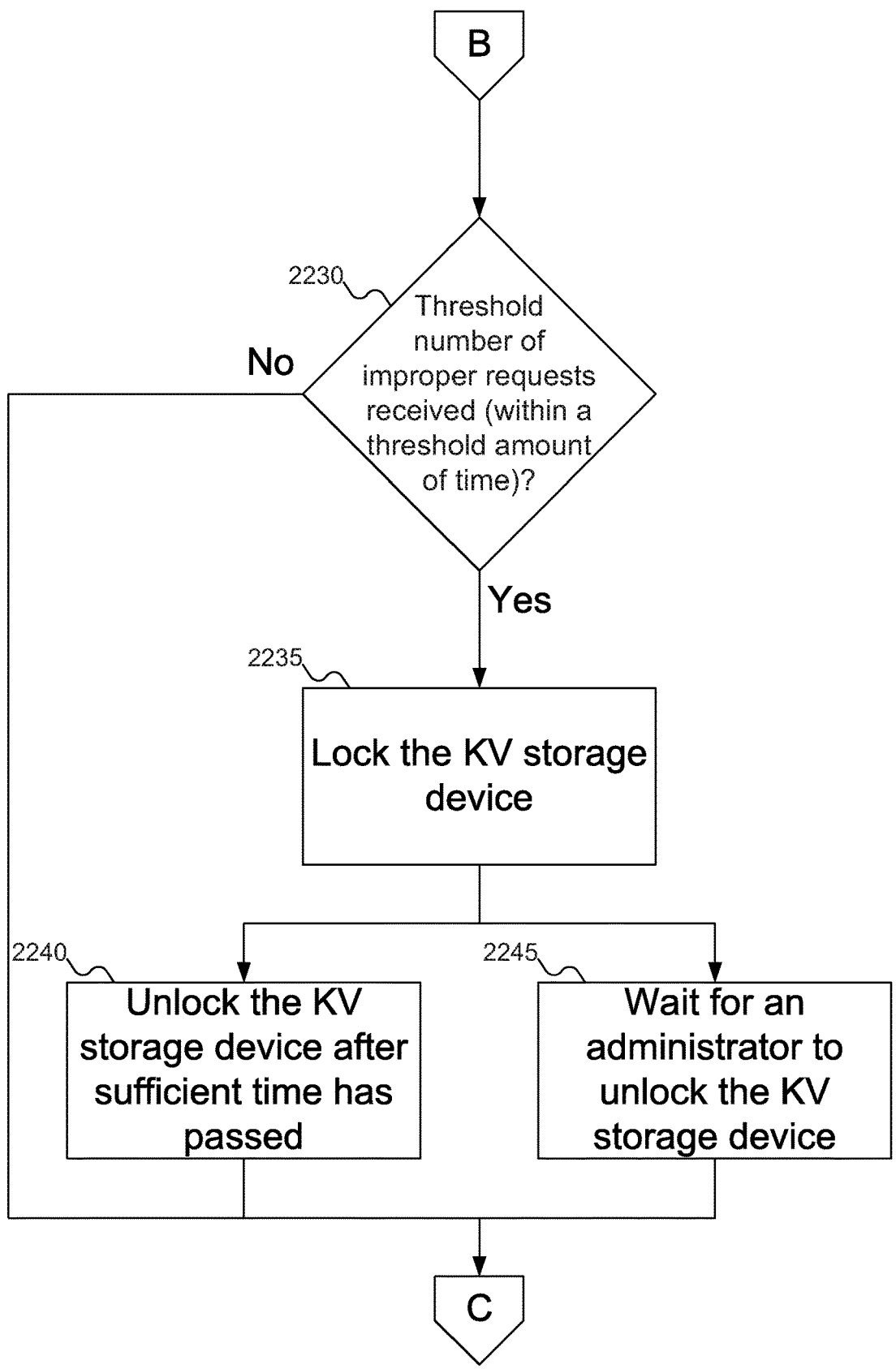

FIGS. 22A-22C show a flowchart of an example procedure for processing block trim request 1005 of FIGS. 10 and 16 using KV-SSD 125 of FIG. 1, according to embodiments of the inventive concept. In FIG. 22A, at block 2205, block emulator 330 of FIG. 3 may check to see if the data to be deleted may exist on KV-SSD 125 of FIG. 1. Note that this check may not be required: if data is not currently stored on KV-SSD 125 of FIG. 1, block emulator 330 of FIG. 3 may simply "skip" deleting "blocks" that are not on KV-SSD 125 of FIG. 1. The check shown in block 2205 is beneficial in that it enables enhanced security by detecting when someone is attempting to delete data that is not actually present on KV-SSD 125 of FIG. 1: KV-SSD 125 of FIG. 1 may then be locked to prevent such access. Note that this check may be completed without actually accessing the objects on KV-SSD 125 of FIG. 1: this check may be performed by accessing the metadata from metadata storage 335 of FIG. 3.

If the target data may be present on KV-SSD 125 of FIG. 1, then as may be seen in FIG. 22B, there are at least two possible paths for processing trim request 1005 of FIGS. 10 and 16. According to one path (the split-merge approach), at block 2210 (FIG. 22B), splitter 605 of FIG. 6 may split block trim request 1005 of FIG. 10 into KV delete requests 1010 of FIG. 10 (one such KV delete request for each "block" affected by block trim request 1005 of FIG. 10). At block 2215, KV-SSD 125 of FIG. 1 may perform each of KV delete requests 1010 of FIG. 10.

Alternatively, (the interval tree approach), at block 2220, block emulator 330 of FIG. 3 may identify objects that are overlapped (either partially or wholly) by block trim request 1005 of FIG. 16. At block 2225, block emulator 330 of FIG. 3 may generate KV delete requests to delete data from objects that are partially or wholly overlapped by block trim request 1005 of FIG. 16 (which KV requests may be performed by KV-SSD 125 of FIG. 1): the keys for the objects to be removed may be found in the metadata in metadata storage 335 of FIG. 3. Note that block 2225 is similar to block 1925, and the approach to accomplish block 2225 is shown in FIGS. 20A-20B.

If the data to be deleted may not present on KV-SSD 125 of FIG. 1, then at block 2230 (FIG. 22C) block emulator 330 of FIG. 3 may check to see if a threshold number of improper requests have been received. Note that the check in block 2230 may measure the number of improper requests since KV-SSD 125 of FIG. 1 was first powered up (or last powered up), or the check in block 2230 may measure the number of improper requests within a threshold interval of time (for example, the past five minutes). If the threshold number of improper inquiries has been met, then at block 2235 block emulator 330 of FIG. 3 may lock KV-SSD 125 of FIG. 1. At block 2240, block emulator 330 of FIG. 3 may unlock KV-SSD 125 of FIG. 1 after a threshold amount of time has passed (for example, five minutes). Alternatively, at block 2245, KV-SSD 125 of FIG. 1 may remain locked until an administrator unlocks KV-SSD 125 of FIG. 1.

As discussed above with reference to FIGS. 13-14, there may also be situations in which data is deleted from the middle of an object. In such situations, the sequences shown in blocks 2210-2215 and 2220-2225 may modified and combined to achieve the result. For example, the (unmodified) tail data may be separated from the rest of the data and written as its own object (similar to what is described for blocks 2220-2225), and the (unmodified) head data may be retained (and the other data deleted as unwanted tail data as in blocks 2220-2225) as the original object.

In FIG. 18-22C, some embodiments of the invention are shown. But a person skilled in the art will recognize that other embodiments of the invention are also possible, by changing the order of the blocks, by omitting blocks, or by including links not shown in the drawings. All such variations of the flowcharts are considered to be embodiments of the invention, whether expressly described or not.

Embodiments of the inventive concept include technical advantages over conventional storage devices. By including a block emulator, a KV storage device may be able to process block requests. Such a configuration enables software, such as operating systems, file systems, and applications, to access data from KV storage devices without having to redesigned to generate KV requests. In addition, because the block emulator may detect requests to read or delete data that is not actually stored on a KV storage device, KV storage device security is enhanced: the KV storage device may be locked to prevent someone from improperly accessing data.

The following discussion is intended to provide a brief, general description of a suitable machine or machines in which certain aspects of the invention may be implemented. The machine or machines may be controlled, at least in part, by input from conventional input devices, such as keyboards, mice, etc., as well as by directives received from another machine, interaction with a virtual reality (VR) environment, biometric feedback, or other input signal. As used herein, the term "machine" is intended to broadly encompass a single machine, a virtual machine, or a system of communicatively coupled machines, virtual machines, or devices operating together. Exemplary machines include computing devices such as personal computers, workstations, servers, portable computers, handheld devices, telephones, tablets, etc., as well as transportation devices, such as private or public transportation, e.g., automobiles, trains, cabs, etc.

The machine or machines may include embedded controllers, such as programmable or non-programmable logic devices or arrays, Application Specific Integrated Circuits (ASICs), embedded computers, smart cards, and the like. The machine or machines may utilize one or more connections to one or more remote machines, such as through a network interface, modem, or other communicative coupling. Machines may be interconnected by way of a physical and/or logical network, such as an intranet, the Internet, local area networks, wide area networks, etc. One skilled in the art will appreciate that network communication may utilize various wired and/or wireless short range or long range carriers and protocols, including radio frequency (RF), satellite, microwave, Institute of Electrical and Electronics Engineers (IEEE) 802.11, Bluetooth®, optical, infrared, cable, laser, etc.

Embodiments of the present invention may be described by reference to or in conjunction with associated data including functions, procedures, data structures, application programs, etc. which when accessed by a machine results in the machine performing tasks or defining abstract data types or low-level hardware contexts. Associated data may be stored in, for example, the volatile and/or non-volatile memory, e.g., RAM, ROM, etc., or in other storage devices and their associated storage media, including hard-drives, floppy-disks, optical storage, tapes, flash memory, memory sticks, digital video disks, biological storage, etc. Associated data may be delivered over transmission environments, including the physical and/or logical network, in the form of packets, serial data, parallel data, propagated signals, etc., and may be used in a compressed or encrypted format. Associated data may be used in a distributed environment, and stored locally and/or remotely for machine access.

Embodiments of the invention may include a tangible, non-transitory machine-readable medium comprising instructions executable by one or more processors, the instructions comprising instructions to perform the elements of the inventions as described herein.

Having described and illustrated the principles of the invention with reference to illustrated embodiments, it will be recognized that the illustrated embodiments may be modified in arrangement and detail without departing from such principles, and may be combined in any desired manner. And, although the foregoing discussion has focused on particular embodiments, other configurations are contemplated. In particular, even though expressions such as "according to an embodiment of the invention" or the like are used herein, these phrases are meant to generally reference embodiment possibilities, and are not intended to limit the invention to particular embodiment configurations. As used herein, these terms may reference the same or different embodiments that are combinable into other embodiments.

The foregoing illustrative embodiments are not to be construed as limiting the invention thereof. Although a few embodiments have been described, those skilled in the art will readily appreciate that many modifications are possible to those embodiments without materially departing from the novel teachings and advantages of the present disclosure. Accordingly, all such modifications are intended to be included within the scope of this invention as defined in the claims.

Embodiments of the invention may extend to the following statements, without limitation:

Statement 1. An embodiment of the inventive concept includes a Key-Value (KV) storage device, comprising:

storage for a first object and a second object, the first object including a first data associated with a first key and the second object including a second data associated with a second key;

a KV translation layer to translate the first key to a first physical address in the storage where the first data is stored and to translate the second key to a second physical address in the storage where the second data is stored;

a KV interface to receive a first KV request involving the first object;

a block interface to receive a block request involving the second object; and a block emulator to generate a second KV request including the second key generated from the block request.

Statement 2. An embodiment of the inventive concept includes the KV storage device according to statement 1, further comprising:

a machine including the KV storage device; and a processor executing a block device driver for the KV storage device, the block device driver including the block interface and the block emulator.

Statement 3. An embodiment of the inventive concept includes the KV storage device according to statement 1, further comprising a host interface logic including the block emulator.

Statement 4. An embodiment of the inventive concept includes the KV storage device according to statement 1, wherein the block emulator generates at least one KV write request based at least in part on the block request including a block write request.

Statement 5. An embodiment of the inventive concept includes the KV storage device according to statement 4, wherein the block emulator further generates at least one KV delete request based at least in part on the block write request.

Statement 6. An embodiment of the inventive concept includes the KV storage device according to statement 4, wherein the block emulator further generates at least one KV read request based at least in part on the block write request.

Statement 7. An embodiment of the inventive concept includes the KV storage device according to statement 1, wherein the block emulator generates at least one KV read request based at least in part on the block request including a block read request.

Statement 8. An embodiment of the inventive concept includes the KV storage device according to statement 1, wherein the block emulator generates at least one KV delete request based at least in part on the block request including a block trim request.

Statement 9. An embodiment of the inventive concept includes the KV storage device according to statement 8, wherein the block emulator further generates at least one KV read request and at least one KV write request based at least in part on the block trim request.

Statement 10. An embodiment of the inventive concept includes the KV storage device according to statement 1, wherein the block emulator includes:

a splitter to split the block request into at least two block requests; and a merger to merge results of the at least two block requests into a single result.

Statement 11. An embodiment of the inventive concept includes the KV storage device according to statement 1, further comprising metadata storage for metadata about the second object.

Statement 12. An embodiment of the inventive concept includes the KV storage device according to statement 1, wherein the block emulator locks the KV storage device if a threshold number of requests result in errors.

Statement 13. An embodiment of the inventive concept includes the KV storage device according to statement 12, wherein the block emulator locks the KV storage if the threshold number of requests result in errors in a first threshold amount of time.

Statement 14. An embodiment of the inventive concept includes the KV storage device according to statement 12, wherein the block emulator unlocks the KV storage device after a second threshold amount of time.

Statement 15. An embodiment of the inventive concept includes the KV storage device according to statement 12, wherein an administrator unlocks the KV storage device.

Statement 16. An embodiment of the inventive concept includes the KV storage device according to statement 1, wherein a block size associated with the block request is user configurable.

Statement 17. An embodiment of the inventive concept includes the KV storage device according to statement 1, wherein the KV storage device includes a KV Solid State Drive (KV-SSD).

Statement 18. An embodiment of the inventive concept includes a method, comprising:

receiving a block request from a source at a block interface emulator for a Key-Value (KV) storage device;

determining a set of KV requests on the KV storage device to emulate the received block request;

performing the set of KV requests on the KV storage device to generate a result; and returning the result from the KV storage device to the source.

Statement 19. An embodiment of the inventive concept includes the method according to statement 18, wherein the block request includes one of a block write request, a block read request, and a block trim request.

Statement 20. An embodiment of the inventive concept includes the method according to statement 18, wherein:

receiving a block request from a source at a block interface emulator for a Key-Value (KV) storage device includes receiving a block write request from the source at the block interface emulator for the KV storage device, the block write request including a Logical Block Address (LBA) and a data; and performing the set of KV requests on the KV storage device includes performing a KV write request to store an object on the KV storage device, the object including the data associated with a key.

Statement 21. An embodiment of the inventive concept includes the method according to statement 20, wherein determining a set of KV requests on the KV storage device to emulate the received block request includes generating the key for the data based at least in part on the LBA.

Statement 22. An embodiment of the inventive concept includes the method according to statement 18, wherein performing the set of KV requests on the KV storage device to generate a result further includes:

reading a second data for a second object from the KV storage device using a second key;

trimming a tail portion of the second data for the object to produce a trimmed data; and updating the second object to store the trimmed data using the key.

Statement 23. An embodiment of the inventive concept includes the method according to statement 22, wherein determining a set of KV requests on the KV storage device to emulate the received block request includes determining that the block write request overlaps the second object.

Statement 24. An embodiment of the inventive concept includes the method according to statement 18, wherein performing the set of KV requests on the KV storage device to generate a result includes:

reading a second data for a second object from the KV storage device using a second key;

trimming a head portion of the second data for the object to produce a trimmed data;

generating a second key for the trimmed data; and storing a second object on the KV storage device to store the trimmed data using the second key.

Statement 25. An embodiment of the inventive concept includes the method according to statement 24, wherein performing the set of KV requests on the KV storage device to generate a result further includes removing the second object from the KV storage device.

Statement 26. An embodiment of the inventive concept includes the method according to statement 24, wherein determining a set of KV requests on the KV storage device to emulate the received block request includes determining that the block write request overlaps the second object.

Statement 27. An embodiment of the inventive concept includes the method according to statement 18, wherein performing the set of KV requests on the KV storage device to generate a result includes removing an object on the KV storage device.

Statement 28. An embodiment of the inventive concept includes the method according to statement 18, wherein:

receiving a block request from a source at a block interface emulator for a Key-Value (KV) storage device includes receiving a block read request from the source at the block interface emulator for the KV storage device, the block read request including a Logical Block Address (LBA); and performing the set of KV requests on the KV storage device to generate a result includes reading an object from the KV storage device, the object including a data associated with a key, the object including the LBA.

Statement 29. An embodiment of the inventive concept includes the method according to statement 28, wherein determining a set of KV requests on the KV storage device to emulate the received block request includes identifying the object as including at least the LBA.

Statement 30. An embodiment of the inventive concept includes the method according to statement 28, wherein performing the set of KV requests on the KV storage device to generate a result further includes selecting a portion of the data from the object.

Statement 31. An embodiment of the inventive concept includes the method according to statement 28, wherein performing the set of KV requests on the KV storage device to generate a result further includes:

reading a second object from the KV storage, the second object including a second data associated with a second key; and merging the data and the second data to produce the result.

Statement 32. An embodiment of the inventive concept includes the method according to statement 31, wherein determining a set of KV requests on the KV storage device to emulate the received block request includes determining that the block read request overlaps the object and the second object.

Statement 33. An embodiment of the inventive concept includes the method according to statement 18, wherein:

the block request includes at least a first LBA and a second LBA;

determining a set of KV requests on the KV storage device to emulate the received block request includes determining a first KV request for the first LBA and a second KV request for the second LBA; and performing the set of KV requests on the KV storage device to generate a result includes performing both the first KV request and the second KV request.

Statement 34. An embodiment of the inventive concept includes the method according to statement 18, further comprising:

receiving at the KV storage a threshold number of block requests that result in errors; and locking the KV storage device.

Statement 35. An embodiment of the inventive concept includes the method according to statement 34, wherein receiving at the KV storage a threshold number of block requests that result in errors includes receiving at the KV storage the threshold number of block requests within a first threshold amount of time that result in errors.

Statement 36. An embodiment of the inventive concept includes the method according to statement 34, further comprising unlocking the KV storage device after a second threshold amount of time.

Statement 37. An embodiment of the inventive concept includes the method according to statement 34, further comprising unlocking the KV storage device by an administrator of the KV storage device.

Statement 38. An embodiment of the inventive concept includes the method according to statement 18, further comprising configuring the block emulator to use a block size.

Statement 39. An embodiment of the inventive concept includes an article, comprising a non-transitory storage medium, the non-transitory storage medium having stored thereon instructions that, when executed by a machine, result in:

receiving a block request from a source at a block interface emulator for a Key-Value (KV) storage device;

determining a set of KV requests on the KV storage device to emulate the received block request;

performing the set of KV requests on the KV storage device to generate a result; and returning the result from the KV storage device to the source.

Statement 40. An embodiment of the inventive concept includes the article according to statement 39, wherein the block request includes one of a block write request, a block read request, and a block trim request.

Statement 41. An embodiment of the inventive concept includes the article according to statement 39, wherein:

receiving a block request from a source at a block interface emulator for a Key-Value (KV) storage device includes receiving a block write request from the source at the block interface emulator for the KV storage device, the block write request including a Logical Block Address (LBA) and a data; and performing the set of KV requests on the KV storage device includes performing a KV write request to store an object on the KV storage device, the object including the data associated with a key.

Statement 42. An embodiment of the inventive concept includes the article according to statement 41, wherein determining a set of KV requests on the KV storage device to emulate the received block request includes generating the key for the data based at least in part on the LBA.

Statement 43. An embodiment of the inventive concept includes the article according to statement 39, wherein performing the set of KV requests on the KV storage device to generate a result further includes:

reading a second data for a second object from the KV storage device using a second key;

trimming a tail portion of the second data for the object to produce a trimmed data; and updating the second object to store the trimmed data using the key.

Statement 44. An embodiment of the inventive concept includes the article according to statement 43, wherein determining a set of KV requests on the KV storage device to emulate the received block request includes determining that the block write request overlaps the second object.

Statement 45. An embodiment of the inventive concept includes the article according to statement 39, wherein performing the set of KV requests on the KV storage device to generate a result includes:

reading a second data for a second object from the KV storage device using a second key;

trimming a head portion of the second data for the object to produce a trimmed data;

generating a second key for the trimmed data; and storing a second object on the KV storage device to store the trimmed data using the second key.

Statement 46. An embodiment of the inventive concept includes the article according to statement 45, wherein performing the set of KV requests on the KV storage device to generate a result further includes removing the second object from the KV storage device.

Statement 47. An embodiment of the inventive concept includes the article according to statement 45, wherein determining a set of KV requests on the KV storage device to emulate the received block request includes determining that the block write request overlaps the second object.

Statement 48. An embodiment of the inventive concept includes the article according to statement 39, wherein performing the set of KV requests on the KV storage device to generate a result includes removing an object on the KV storage device.

Statement 49. An embodiment of the inventive concept includes the article according to statement 39, wherein:

receiving a block request from a source at a block interface emulator for a Key-Value (KV) storage device includes receiving a block read request from the source at the block interface emulator for the KV storage device, the block read request including a Logical Block Address (LBA); and performing the set of KV requests on the KV storage device to generate a result includes reading an object from the KV storage device, the object including a data associated with a key, the object including the LBA.

Statement 50. An embodiment of the inventive concept includes the article according to statement 49, wherein determining a set of KV requests on the KV storage device to emulate the received block request includes identifying the object as including at least the LBA.

Statement 51. An embodiment of the inventive concept includes the article according to statement 49, wherein performing the set of KV requests on the KV storage device to generate a result further includes selecting a portion of the data from the object.

Statement 52. An embodiment of the inventive concept includes the article according to statement 49, wherein performing the set of KV requests on the KV storage device to generate a result further includes:

reading a second object from the KV storage, the second object including a second data associated with a second key; and merging the data and the second data to produce the result.

Statement 53. An embodiment of the inventive concept includes the article according to statement 52, wherein determining a set of KV requests on the KV storage device to emulate the received block request includes determining that the block read request overlaps the object and the second object.

Statement 54. An embodiment of the inventive concept includes the article according to statement 39, wherein:

the block request includes at least a first LBA and a second LBA;

determining a set of KV requests on the KV storage device to emulate the received block request includes determining a first KV request for the first LBA and a second KV request for the second LBA; and performing the set of KV requests on the KV storage device to generate a result includes performing both the first KV request and the second KV request.

Statement 55. An embodiment of the inventive concept includes the article according to statement 39, the non-transitory storage medium having stored thereon further instructions that, when executed by the machine, result in:

receiving at the KV storage a threshold number of block requests that result in errors; and locking the KV storage device.

Statement 56. An embodiment of the inventive concept includes the article according to statement 55, wherein receiving at the KV storage a threshold number of block requests that result in errors includes receiving at the KV storage the threshold number of block requests within a first threshold amount of time that result in errors.

Statement 57. An embodiment of the inventive concept includes the article according to statement 55, the non-transitory storage medium having stored thereon further instructions that, when executed by the machine, result in unlocking the KV storage device after a second threshold amount of time.

Statement 58. An embodiment of the inventive concept includes the article according to statement 55, the non-transitory storage medium having stored thereon further instructions that, when executed by the machine, result in unlocking the KV storage device by an administrator of the KV storage device.

Statement 59. An embodiment of the inventive concept includes the article according to statement 39, the non-transitory storage medium having stored thereon further instructions that, when executed by the machine, result in configuring the block emulator to use a block size.

Consequently, in view of the wide variety of permutations to the embodiments described herein, this detailed description and accompanying material is intended to be illustrative only, and should not be taken as limiting the scope of the invention. What is claimed as the invention, therefore, is all such modifications as may come within the scope and spirit of the following claims and equivalents thereto.

What is claimed is:

1. A method, comprising:
   receiving a block request from a source at a block emulator in a Key-Value (KV) Solid State Drive (SSD);
   determining a set of KV requests on the KV SSD to emulate the received block request;
   performing the set of KV requests on the KV SSD to generate a result; and
   returning the result from the KV SSD to the source.

2. The method according to claim 1, wherein:
   receiving a block request from a source at a block emulator in a Key-Value (KV) SSD includes receiving a block write request from the source at the block emulator in the KV SSD, the block write request including a Logical Block Address (LBA) and a data; and
   performing the set of KV requests on the KV SSD includes performing a KV write request to store an object on the KV SSD, the object including the data associated with a key.

3. The method according to claim 1, wherein performing the set of KV requests on the KV SSD to generate a result further includes:
   reading a second data for a second object from the KV SSD using a second key;
   trimming a tail portion of the second data for the object to produce a trimmed data; and
   updating the second object to store the trimmed data using the key.

4. The method according to claim 1, wherein performing the set of KV requests on the KV SSD to generate a result includes:
   reading a second data for a second object from the KV SSD using a second key;
   trimming a head portion of the second data for the object to produce a trimmed data;
   generating a second key for the trimmed data; and
   storing a second object on the KV SSD to store the trimmed data using the second key.

5. The method according to claim 1, wherein performing the set of KV requests on the KV SSD to generate a result includes removing an object on the KV SSD.

6. The method according to claim 1, wherein:
   receiving a block request from a source at a block emulator in a Key-Value (KV) SSD includes receiving a block read request from the source at the block emulator in the KV SSD, the block read request including a Logical Block Address (LBA); and
   performing the set of KV requests on the KV SSD to generate a result includes reading an object from the KV SSD, the object including a data associated with a key, the object including the LBA.

7. The method according to claim 1, further comprising:
   receiving at the KV SSD a threshold number of block requests that result in errors; and
   locking the KV SSD.

8. The method according to claim 1, further comprising configuring the block emulator to use a user-defined block size.

9. An article, comprising a non-transitory storage medium, the non-transitory storage medium having stored thereon instructions that, when executed by a machine, result in:
   receiving a block request from a source at a block emulator in a Key-Value (KV) Solid State Drive (SSD);
   determining a set of KV requests on the KV SSD to emulate the received block request;
   performing the set of KV requests on the KV SSD to generate a result; and
   returning the result from the KV SSD to the source.

10. The article according to claim 9, the non-transitory storage medium having stored thereon further instructions that, when executed by the machine, result in:
    receiving at the KV SSD a threshold number of block requests that result in errors; and
    locking the KV SSD.

11. A Key-Value (KV) Solid State Drive (SSD), comprising:
    storage for a first object and a second object, the first object including a first data associated with a first key and the second object including a second data associated with a second key;
    a KV translation layer to translate the first key to a first physical address in the storage where the first data is stored and to translate the second key to a second physical address in the storage where the second data is stored;
    a KV interface to receive a first KV request involving the first object;
    a block interface to receive a block request involving the second object; and
    a block emulator to generate a second KV request including the second key from the block request.

12. The KV SSD according to claim 11, wherein the block emulator generates at least one KV write request based at least in part on the block request including a block write request.

13. The KV SSD according to claim 12, wherein the block emulator further generates at least one KV delete request based at least in part on the block write request.

14. The KV SSD according to claim 12, wherein the block emulator further generates at least one KV read request based at least in part on the block write request.

15. The KV SSD according to claim 11, wherein the block emulator generates at least one KV read request based at least in part on the block request including a block read request.

16. The KV SSD according to claim 11, wherein the block emulator generates at least one KV delete request based at least in part on the block request including a block trim request.

17. The KV SSD according to claim 11, wherein the block emulator includes:
- a splitter to split the block request into at least two block requests; and
- a merger to merge results of the at least two block requests into a single result.

18. The KV SSD according to claim 11, further comprising metadata storage for metadata about the second object, wherein the metadata about the second object is different from the second key.

19. The KV SSD according to claim 11, wherein the block emulator locks the KV SSD based at least in part on the KV SSD returning errors in response to a threshold number of requests.

* * * * *